United States Patent
Lee et al.

(10) Patent No.: US 11,334,281 B2
(45) Date of Patent: May 17, 2022

(54) STORAGE DEVICE, MEMORY CONTROLLER AND OPERATING METHOD OF THE MEMORY CONTROLLER

(71) Applicant: SK hynix Inc., Icheon-si (KR)

(72) Inventors: Han Bin Lee, Icheon-si (KR); Beom Ju Shin, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 0 days.

(21) Appl. No.: 17/094,308

(22) Filed: Nov. 10, 2020

(65) Prior Publication Data

US 2021/0373795 A1 Dec. 2, 2021

(30) Foreign Application Priority Data

May 27, 2020 (KR) .......................... 10-2020-0063685

(51) Int. Cl.
 *G06F 3/06* (2006.01)
(52) U.S. Cl.
 CPC .......... *G06F 3/0653* (2013.01); *G06F 3/0625* (2013.01); *G06F 3/0659* (2013.01); *G06F 3/0679* (2013.01)
(58) Field of Classification Search
 CPC .................. G06F 3/06–0689; G06F 1/32–3296
 See application file for complete search history.

(56) References Cited

U.S. PATENT DOCUMENTS

| 2013/0301372 | A1* | 11/2013 | Park | G11C 7/22 365/227 |
|---|---|---|---|---|
| 2016/0313946 | A1* | 10/2016 | Zang | G06F 3/0679 |
| 2017/0139590 | A1* | 5/2017 | Hsu | G06F 1/3275 |
| 2018/0121096 | A1* | 5/2018 | Um | G06F 3/0659 |
| 2018/0335978 | A1* | 11/2018 | Tidwell | G06F 3/0688 |
| 2021/0005244 | A1* | 1/2021 | Hiscock | G11C 11/4096 |
| 2021/0349663 | A1* | 11/2021 | Yu | G11C 11/4074 |

FOREIGN PATENT DOCUMENTS

| KR | 1020170062635 A | 6/2017 |
|---|---|---|
| KR | 1020190052884 A | 5/2019 |

* cited by examiner

*Primary Examiner* — Nicholas J Simonetti
(74) *Attorney, Agent, or Firm* — William Park & Associates Ltd.

(57) ABSTRACT

An electronic device, and more particularly, a storage device for mitigating periods where a peak current occurs from currents overlapping is provided. The storage device includes a memory device including a plurality of dies and a memory controller controlling the memory device. The memory device generates status information about an amount of current consumed by each of the plurality of dies during a busy period when all of the plurality of dies are in a busy state, and wherein the memory controller determines, based on the status information, whether peak currents for multiple dies of the plurality of dies are consumed in a common sub-period of a plurality of sub-periods which span the busy period, and when it is determined that peak currents for multiple dies are consumed in the common sub-period, the memory controller controls the memory device to suspend an operation on a die among the plurality of dies.

20 Claims, 18 Drawing Sheets

| CURRENT | BINARY NUMBER |
|---|---|
| 0~50 | 00 |
| 51~75 | 01 |
| 76~90 | 10 |
| 91~100 | 11 |

FIG. 12

|    | DIE1 | DIE2 |
|----|------|------|
| A1 | 11   | 11   |
| A3 | 10   | 10   |
| A5 | 01   | 01   |
| A7 | 00   | 00   |
| A9 | 01   | 01   |

STORAGE DEVICE, MEMORY CONTROLLER AND OPERATING METHOD OF THE MEMORY CONTROLLER

CROSS-REFERENCE TO RELATED APPLICATION

The present application claims priority under 35 U.S.C. § 119(a) to Korean patent application number 10-2020-0063685, filed on May 27, 2020, in the Korean intellectual Property Office, the entire disclosure of which is incorporated herein by reference.

BACKGROUND

1. Technical Field

Various embodiments of the present disclosure generally relate to an electronic device, and more particularly, to a storage device and an operating method of the storage device.

2. Related Art

A storage device may store data under the control of a host device such as a computer, a smartphone, or a smartpad, Examples of storage devices include a device for storing data on a magnetic disk, such as a Hard Disk Drive (HDD), and a device for storing data in semiconductor memory, especially in nonvolatile memory, such as a Solid State Drive (SSD) or a memory card.

A storage device may include a memory device for storing data and a memory controller for controlling the memory device to store data, Memory devices may be classified as volatile memory devices or nonvolatile memory devices. Examples of nonvolatile memory devices include a Read Only Memory (ROM) device, a Programmable ROM (PROM) device, an Electrically Programmable ROM (EPROM) device, an Electrically Erasable and Programmable ROM (EEPROM) device, a flash memory device, a Phase-change RAM (PRAM) device, a Magnetic RAM (MRAM) device, a Resistive RAM (RRAM) device, and a Ferroelectric RAM (FRAM) device.

SUMMARY

Various embodiments are directed to a storage device for mitigating periods when a peak current occurs from overlapping currents and a method of operating the storage device.

According to an embodiment, a memory controller for controlling a memory device that includes a plurality of dies may include a status information determining component configured to determine, based on status information received from the memory device during a busy period when all of the plurality of dies are in a busy state, whether peak currents for multiple dies of the plurality of dies occur in a common sub-period of a plurality of sub-periods which span the busy period, and configured to generate suspend information based on the determination. The memory controller also includes a peak current controller configured to output, based on the suspend information, a suspend command to suspend, during the common sub-period, an operation on at least one die among the multiple dies.

According to an embodiment, a method of operating a memory controller for controlling a memory device that includes a plurality of dies includes receiving status information from the memory device during a busy period when all of the plurality of dies are in a busy state. The method also includes determining, based on the status information, whether peak currents for multiple dies of the plurality of dies occur in a common sub-period of a plurality of sub-periods which span the busy period. The method further includes generating suspend information, based on the determination, for suspending an operation on at least one die among the multiple dies. The method additionally includes outputting, based on the suspend information, a suspend command to suspend, during the common sub-period, the operation on the at least one die.

According to an embodiment, a storage device includes a memory device including a plurality of dies and a memory controller controlling the memory device. The memory device generates status information about an amount of current consumed by each of the plurality of dies during a busy period when all of the plurality of dies are in a busy state. The memory controller determines, based on the status information, whether peak currents for multiple dies of the plurality of dies are consumed in a common sub-period of a plurality of sub-periods which span the busy period, and when it is determined that peak currents for multiple dies are consumed in the common sub-period, the memory controller controls the memory device to suspend an operation on a die among the plurality of dies.

BRIEF DESCRIPTION OF THE DRAWINGS

FIG. 12 is a table showing a method of determining whether periods during which a peak current occurs overlap based on status information.

DETAILED DESCRIPTION

Hereinafter, specific structural or functional descriptions of examples of embodiments in accordance with concepts which are disclosed in this specification are illustrated only to describe the examples of embodiments in accordance with the concepts and the examples of embodiments in accordance with the concepts may be carried out through various forms but the descriptions are not limited to the examples of embodiments described in this specification.

Hereinafter, embodiments of the present disclosure are described with reference to the accompanying drawings in order for those skilled in the art to be able to implement the technical spirit of the present disclosure.

Figure 1:
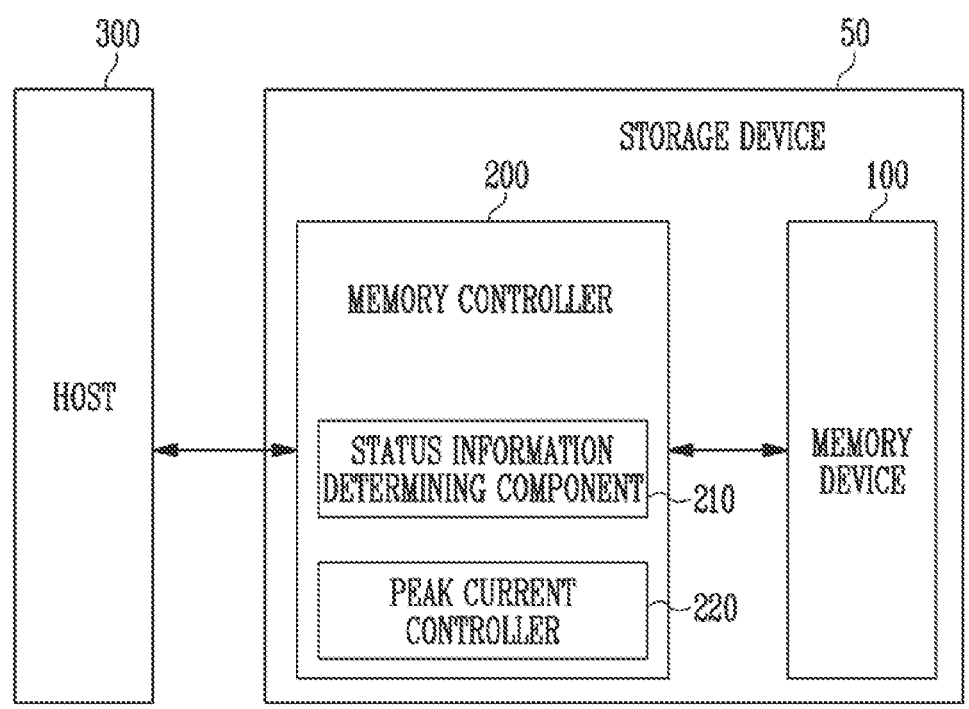
FIG. 1 is a block diagram illustrating a storage device.

FIG. 1 is a block diagram illustrating a storage device 50.

Referring to FIG. 1, the storage device 50 may include a memory device 100 and a memory controller 200.

The storage device 50 may store data in response to control of a host 300. Examples of the host include a cellular phone, a smartphone, an MP3 player, a laptop computer, a desktop computer, a game player, a TV, a tablet PC, or an in-vehicle infotainment system.

The storage device 50 may be configured as one of various types of storage devices according to a host interface corresponding to a communication method with the host 300. For example, the storage device 50 may be configured as one of various types of storage devices such as a Solid State Drive (SSD); a multimedia card (MMC) in the form of an eMMC, an RS-MMC, or a micro-MMC; a secure digital (SD) card; a mini-SD card; a micro-SD card; a universal serial bus (USB) storage device; a universal flash storage (UFS) device; a personal computer memory card international association (PCMCIA) card type storage device; a peripheral component interconnection (PCI) card type storage device; a PCI express (PCI-E) card type storage device; a compact flash (CF) card; a smart media card; or a memory stick.

The storage device 50 may be manufactured as one of various types of packages. For example, the storage device 50 may be manufactured as a package on package (POP), a system in package (SIP), a system on chip (SOC), a multi-chip package (MCP), a chip on board (COB), a wafer-level fabricated package (WFP), or a wafer-level stack package (WSP).

The memory device 100 may store data. The memory device 100 may operate in response to control of the memory controller 200. The memory device 100 may include a memory cell array including a plurality of memory cells storing data. The memory cell array may include a plurality of memory blocks. Each of the memory blocks may include a plurality of memory cells and the plurality of memory cells may form a plurality of pages. According to an embodiment, a page may be a unit for storing data in the memory device 100 or reading data stored in the memory device 100. The memory block may be a unit for erasing data.

According to an embodiment, the memory device 100 may be a Double Data Rate Synchronous Dynamic Random Access Memory (DDR SDRAM) device, a Low Power Double Data Rate4 (LPDDR4) SDRAM device, a Graphics Double Data Rate (GDDR) SDRAM device, a Low Power DDR (LPDDR) device, a Rambus Dynamic Random Access Memory (RDRAM) device, a NAND flash memory device, a Vertical NAND flash memory device, a NOR flash memory device, a resistive random access memory (RRAM) device, a phase-change memory (PRAM) device, a magnetoresistive random access memory (MRAM) device, a ferroelectric random access memory (FRAM) device, or a spin-transfer torque random access memory (STT-RAM) device. For convenience of explanation, it is assumed that the memory device 100 is a NAND flash memory device in the context of the following description.

The memory device 100 may have a two-dimensional or three-dimensional array structure. Hereinafter, a three-dimensional array structure is described as an embodiment. However, embodiments are not limited to the three-dimensional array structure. The embodiments of the present disclosure may be applied not only to a flash memory device in which a charge storage layer includes a conductive floating gate (FG), but also to a charge trap flash (CTF) memory device in which a charge storage layer includes an insulating layer.

According to an embodiment, the memory device 100 may operate by a Single-Level Cell (SLC) method in which one memory cell stores one bit of data. Alternatively, the memory device 100 may operate by a method in which one memory cell stores at least two bits of data. For example, the memory device 100 may operate by a Multi-Level Cell (MLC) method in which one memory cell stores two bits of data, a Triple-Level Cell (TLC) method in which one memory cell stores three bits of data, or a Quadruple-Level Cell (QLC) method in which one memory cell stores four bits of data.

The memory device 100 may receive a command and an address from the memory controller 200, and access an area selected by the address in the memory cell array. That is, the memory device 100 may perform an operation corresponding to the command on the area selected by the address. For example, the memory device 100 may perform a write operation (or a program operation), a read operation, or an erase operation according to the received command. For example, when a program command is received, the memory device 100 may program data into the area selected by the address. When a read command is received, the memory device 100 may read data from the area selected by the address. When an erase command is received, the memory device 100 may erase data stored in the area selected by the address.

According to an embodiment, the memory controller 200 may include a status information determining component 210. The status information determining component 210 may determine states of a plurality of dies included in the memory device 100 and also determine whether to suspend an operation performed on one of the plurality of dies.

For example, the status information determining component 210 may receive a ready/busy signal R/B from the plurality of dies. A ready signal may indicate that a die is in a ready state where the die is standing by without performing an operation. A busy signal may indicate that a die is in a busy state where the die is performing an operation.

According to an embodiment, when all signals received from the plurality of dies are busy signals, the status information determining component 210 may output a status read command to each of the plurality of dies. The memory device 100 may output status information in response to the status read command received from the status information determining component 210. The status information may include information indicating a current consumed by each of the plurality of dies.

For example, the memory device 100 may subdivide a period of time during which each of the plurality of dies is in a busy state into sub-periods of a predetermined length and may set and output a bit indicating an amount of current consumption corresponding to the sub-periods as status information.

According to an embodiment, the status information determining component 210 may determine a sub-period in which peak currents overlap based on the status information received from the memory device 100. The status information determining component 210 may select one of the plurality of dies during the sub-period in which the peak current overlap occurs and may generate suspend information including information about the selected die and a time for which an operation on the selected die is suspended. The time interval during which the operation on the selected die is suspended may be the same as the sub-period in which the peak current overlap occurs. Furthermore, the suspend information may be transferred to a peak current controller 220.

According to an embodiment, the memory controller 200 may include the peak current controller 220. The peak current controller 220 may determine the output of a suspend command based on the suspend information received from the status information determining component 210.

For example, when the suspend information includes information for instructing that an operation on a predetermined die should be suspended, the peak current controller 220 may output a suspend command to the predetermined die on which the operation is to be suspended.

The memory controller 200 may control general operation of the memory device 50.

When a power voltage is applied to the storage device 50, the memory controller 200 may execute firmware. When the memory device 100 is a flash memory device, the memory controller 200 may execute firmware such as a Flash Translation Layer (FTL) for controlling communication between the host 300 and the memory device 100.

According to an embodiment, the memory controller 200 may receive data and a logical block address (LBA) from the host 300 and include firmware (not shown) that translates the LBA into a physical block address (PBA) indicating an address of memory cells in which data included in the memory device 100 is to be stored. In addition, the memory controller 200 may store a logical-physical address mapping table configuring a mapping relationship between the LBA and the PBA in buffer memory.

The memory controller 200 may control the memory device 100 to perform a program operation, a read operation, an erase operation, or the like in response to a request from the host 300. For example, when the memory controller 200 receives a program request from the host 300, the memory controller 200 may convert the program request to a program command and may provide the program command, a PBA, and data to the memory device 100. When the memory controller 200 receives a read request, together with an LBA, from the host 300, the memory controller 200 may convert the read request to a read command, select a PBA corresponding to the LBA, and may then provide the read command and the PBA to the memory device 100. When the memory controller 200 receives an erase request, together with an LBA, from the host 300, the memory controller 200 may convert the erase request to an erase command, select a PBA corresponding to the LBA, and may then provide the erase command and the PBA to the memory device 100.

According to an embodiment, the memory controller 200 may generate and transfer a program command, an address, and data to the memory device 100 without a request from the host 300, For example, the memory controller 200 may provide a command, an address, and data to the memory device 100 to perform background operations, such as a program operation for wear leveling and a program operation for garbage collection.

According to an embodiment, the storage device 50 may further include buffer memory (not shown), The memory controller 200 may control data exchange between the host 300 and the buffer memory (not shown). Alternatively, the memory controller 200 may temporarily store system data for controlling the memory device 100 to the buffer memory. For example, the memory controller 200 may temporarily store data input from the host 300 and transfer the data temporarily stored in the buffer memory to the memory device 100 thereafter.

According to various embodiments, the buffer memory may serve as operational memory or cache memory of the memory controller 200. The buffer memory may store codes or commands executed by the memory controller 200. Alternatively, the buffer memory may store data processed by the memory controller 200.

According to an embodiment, the buffer memory may include dynamic random access memory (DRAM), such as Double Data Rate Synchronous Dynamic Random Access Memory (DDR SDRAM), Low Power Double Data Rate4 (LPDDR4) SDRAM, Graphics Double Data Rate (DDDR) SDRAM, Low Power DDR (LPDDR), or Rambus Dynamic Random Access Memory (RDRAM), or static random access memory (SRAM).

According to various embodiments, the buffer memory may be coupled to the storage device 50 outside the storage device 50. Volatile memory devices coupled to the storage device 50 outside the storage device 50 may function as the buffer memory.

According to an embodiment, the memory controller 200 may control multiple memory devices. The memory controller 200 may control the memory devices according to an interleaving scheme so as to improve operational performance.

The host 300 may communicate with the storage device 50 using at least one of various communication methods such as a Universal Serial Bus (USB), Serial AT Attachment (SATA), a Serial Attached SCSI (SAS), a High Speed Interchip (HSIC), a Small Computer System Interface (SCSI), a Peripheral Component Interconnection (PCI), PCI express (PCIe), NonVolatile Memory express (NVMe), Universal Flash Storage (UFS), Secure Digital (SD), a Multi-Media Card (MMC), an embedded MMC (eMMC), a Dual In-line Memory Module (DIMM), a Registered DIMM (RDIMM), and/or a Load Reduced DIMM (LRDIMM).

Figure 2:
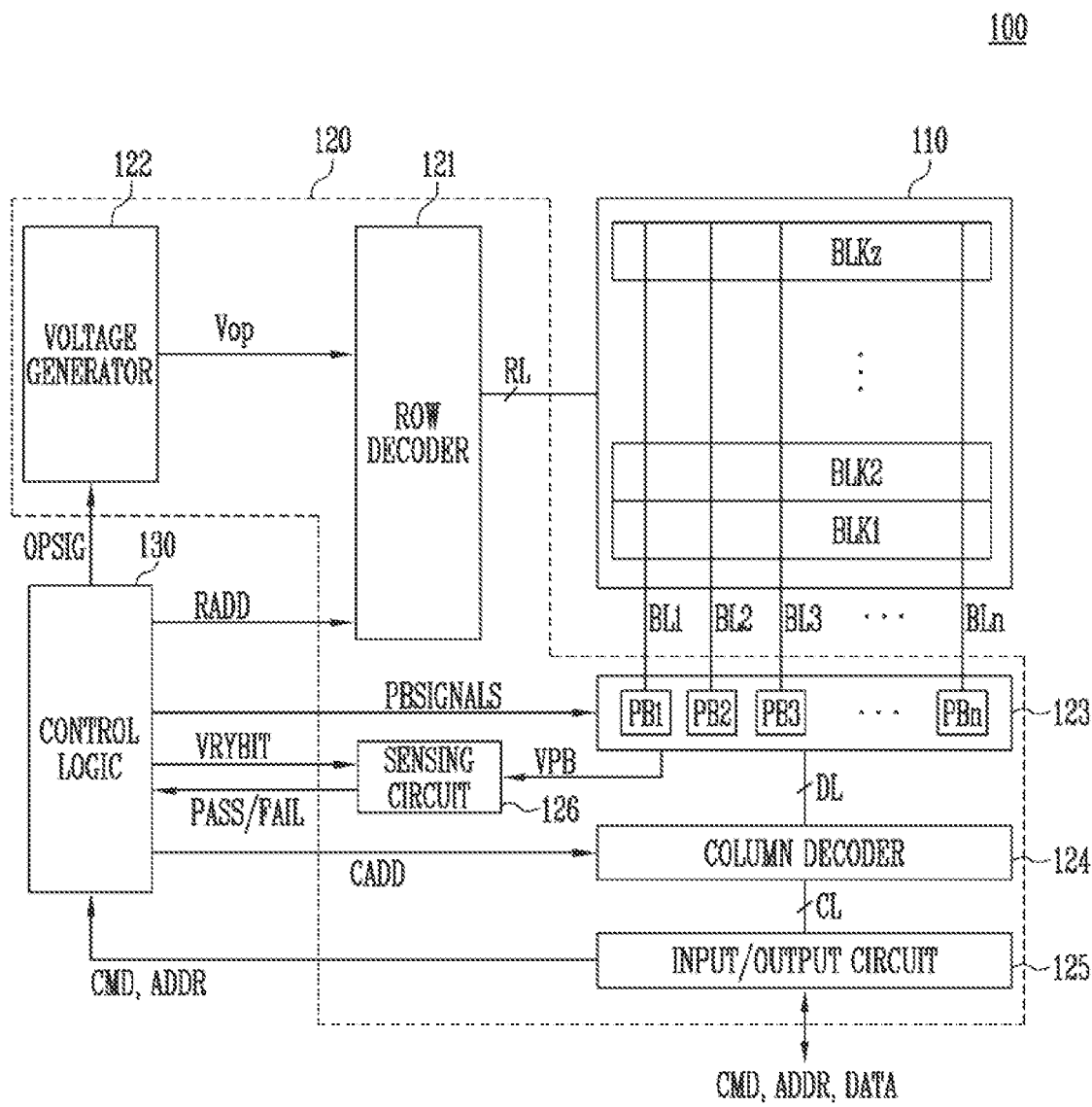
FIG. 2 is a diagram illustrating a structure of a memory device shown in FIG. 1.

FIG. 2 is a diagram illustrating a structure of the memory device 100 shown in FIG.

Referring to FIG. 2, the memory device 100 may include a memory cell array 110, a peripheral circuit 120, and control logic 130.

The memory cell array 110 may include a plurality of memory blocks BLK1 to BLKz. The plurality of memory blocks BLK1 to BLKz may be coupled to a row decoder 121 through row lines RL. The plurality of memory blocks BLK1 to BLKz may be coupled to a page buffer group 123 through bit lines BL1 to BLn. Each of the plurality of memory blocks BLK1 to BLKz may include a plurality of memory cells. According to an embodiment, the plurality of memory cells may be nonvolatile memory cells. Memory cells coupled to the same word line may be defined as one page. Therefore, each memory block may include a plurality of pages.

The row lines RL may include at least one source select line, a plurality of word lines, and at least one drain select line.

Each of the memory cells included in the memory cell array 110 may include a Single-Level Cell (SLC) storing one bit of data, a Multi-Level Cell (MLC) storing two bits of data, a Triple-Level Cell (TLC) storing three bits of data, or a Quadruple-Level Cell (QLC) storing four bits of data.

The peripheral circuit 120 may be configured to perform a program operation, a read operation, or an erase operation on a selected area of the memory cell array 110 in response to control of the control logic 130, The peripheral circuit 120 may drive the memory cell array 110. For example, the peripheral circuit 120 may apply various operating voltages to the row lines RL and the bit lines BL1 to BLn or discharge the applied voltages in response to control of the control logic 130.

The peripheral circuit 120 may include the row decoder 121, a voltage generator 122, the page buffer group 123, a column decoder 124, an input/output circuit 125, and a sensing circuit 126.

The row decoder 121 may be coupled to the memory cell array 110 through the row lines RL. The row lines RL may include at least one source select line, a plurality of word lines, and at least one drain select line. According to an embodiment, the word lines may include normal word lines and dummy word lines, According to an embodiment, the row lines RL may further include a pipe select line.

The row decoder 121 may decode a row address RADA received from the control logic 130. The row decoder 121 may select at least one memory block among the memory blocks BLK1 to BLKz according to the decoded address. In addition, the row decoder 121 may select at least one word line of the selected memory block so as to apply voltages generated by the voltage generator 122 to at least one word line WL according to the decoded address.

For example, during a program operation, the row decoder 121 may apply a program voltage to the selected word line and a program pass voltage having a lower voltage level than the program voltage to unselected word lines. During a program verify operation, the row decoder 121 may apply a verify voltage to the selected word line and a verify pass voltage having a higher voltage level than the verify voltage to the unselected word lines, During a read operation, the row decoder 121 may apply a read voltage to the selected word line and a read pass voltage having a higher voltage level than the read voltage to the unselected word lines.

According to an embodiment, an erase operation of the memory device 100 may be performed in units of memory blocks. During an erase operation, the row decoder 121 may select one of the memory blocks according to the decoded address. During the erase operation, the row decoder 121 may apply a ground voltage to word lines coupled to the selected memory block.

The voltage generator 122 may operate in response to control of the control logic 130, The voltage generator 122 may generate a plurality of voltages by using an external power voltage supplied to the memory device 100. More specifically, the voltage generator 122 may generate various operating voltages Vop applied to perform program, read and erase operations in response to an operation signal OPSIG, For example, the voltage generator 122 may generate a program voltage, a verify voltage, a pass voltage, a read voltage, and an erase voltage in response to control of the control logic 130.

According to an embodiment, the voltage generator 122 may generate an internal power voltage by regulating an external power voltage. The internal power voltage generated by the voltage generator 122 may be used as an operating voltage of the memory device 100.

According to an embodiment, the voltage generator 122 may generate a plurality of voltages by using the external power voltage or the internal power voltage.

For example, the voltage generator 122 may include a plurality of pumping capacitors receiving the internal power voltage and generate a plurality of voltages by selectively activating the plurality of pumping capacitors in response to control of the control logic 130.

The plurality of generated voltages may be supplied to the memory cell array 110 by the row decoder 121.

The page buffer group 123 may include first to nth page buffers PB1 to PBn. The first to nth page buffers PB1 to PBn may be coupled to the memory cell array 110 through the first to nth bit lines BL1 to BLn, respectively. The first to nth page buffers PB1 to PBn may operate in response to control of the control logic 130. More specifically, the first to nth page buffers PB1 to PBn may operate in response to page buffer control signals PBSIGNALS. For example, the first to nth page buffers PB1 to PBn may temporarily store data received through the first to nth bit lines BL1 to BLn, or may sense voltages or currents of the bit lines BL1 to BLn during a read or verify operation.

More specifically, during a program operation, the first to nth page buffers PB1 to PBn may transfer data DATA received through the input/output circuit 125 to selected memory cells through the first to nth bit lines BL1 to BLn when a program voltage is applied to a selected word line, Memory cells of a page selected according to the transferred data DATA may be programmed. During a program verify operation, the first to nth page buffers PB1 to PBn may read page data from the selected memory cells by sensing a voltage or a current received through the first to nth bit lines BL1 to BLn, respectively.

During a read operation, the first to nth page buffers PB1 to PBn may read the data DATA from the memory cells of the selected page through the first to nth bit lines BL1 to BLn and output the read data DATA to the input/output circuit 125 in response to control of the column decoder 124.

During an erase operation, the first to nth page buffers PB1 to PBn may float the first to nth bit lines BL1 to BLn or may apply an erase voltage.

The column decoder 124 may transfer data between the input/output circuit 125 and the page buffer group 123 in response to a column address CADD. For example, the column decoder 124 may exchange data with the first to nth page buffers PB1 to PBn through data lines DL, or may exchange data with the input/output circuit 125 through column lines CL.

The input/output circuit 125 may transfer a command CMD and an address ADDR received from the memory controller 200 shown in and described with reference to FIG. 1 to the control logic 130, or may exchange the data DATA with the column decoder 124.

The sensing circuit 126 may generate a reference current in response to an allowable bit VRYBIT signal and compare a sensing voltage VPB received from the page buffer group 123 with a reference voltage generated by the reference current to output a pass signal PASS or a fail signal FAIL during a read operation or a verify operation.

The control logic 130 may control the peripheral circuit 120 by outputting the operation signal OPSIG, the row address RADD, the page buffer control signals PBSIG-NALS, and the allowable bit VRYBIT in response to the command CMD and the address ADDR. For example, the control logic 130 may control a read operation of a selected memory block in response to a sub-block read command and an address. In addition, the control logic 130 may control an erase operation of a selected sub-block included in the selected memory block in response to a sub-block erase command and an address. In addition, the control logic 130 may determine whether a verify operation has passed or failed in response to the pass or fail signal PASS or FAIL. The control logic 130 may be implemented as hardware, software, or a combination of hardware and software. For example, the control logic 130 may be a control logic circuit operating in accordance with an algorithm and/or a processor executing control logic code.

Figure 3:
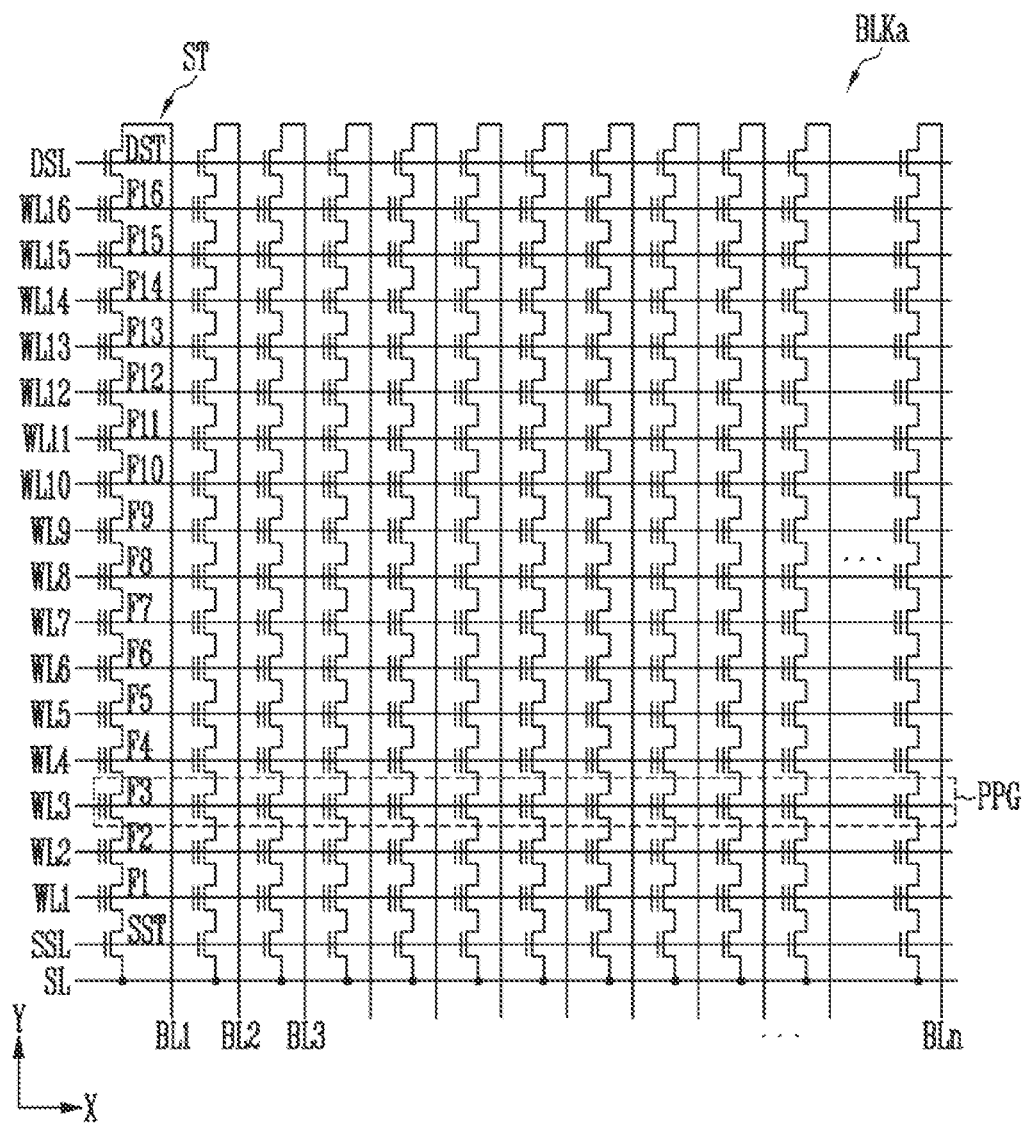
FIG. 3 is a diagram illustrating an embodiment of a memory cell array shown in FIG. 2.

FIG. 3 is a diagram illustrating an embodiment of the memory cell array 110 shown in FIG. 2.

Referring to FIGS. 2 and 3, FIG. 3 is a circuit diagram showing one memory block BLKa among the plurality of memory blocks BLK1 to BLKz included in the memory cell array 110 shown in FIG. 2.

A first select line, word lines, and a second select line arranged in parallel with each other may be coupled to the memory block BLKa. For example, the word lines may be arranged in parallel with each other between the first and second select lines. The first select line may be a source select line SSL and the second select line may be a drain select line DSL.

More specifically, the memory block BLKa may include a plurality of strings coupled between the bit lines BL1 to BLn and a source line SL. The hit lines BL1 to BLn may be coupled to the strings, respectively, and the source line SL may be coupled in common to the strings. Because the strings may have the same configuration, a string ST coupled to the first bit line BL1 is described as an example.

The string ST may include a source select transistor SST, a plurality of memory cells F1 to F16, and a drain select transistor DST coupled in series between the source line SL and the first bit line BL1. Each string ST may include at least one source select transistor SST, at least one drain select transistor DST, and more memory cells than the memory cells F1 to F16 shown in FIG. 3.

A source of the source select transistor SST may be coupled to the source line SL and a drain of the drain select transistor DST may be coupled to the first bit line BL1, The memory cells F1 to F16 may be coupled in series between the source select transistor SST and the drain select transistor DST. Gates of the source select transistors SST included in different strings ST may be coupled to the source select line SSL, gates of the drain select transistors DST may be coupled to the drain select line DSL, and gates of the memory cells F1 to F16 may be coupled to a plurality of word lines WL1 to WL16, respectively, A group of memory cells coupled to the same word line, among memory cells included in different strings ST, may be referred to as a physical page PPG. Therefore, the memory block BLKa may include as many physical pages PPG as the number of the word lines WL1 to WL16.

A single memory cell may store one bit of data. Typically, this memory cell is called a Single-Level Cell (SLC). One physical page (PPG) including SLCs may store one logical page (LPG) of data, One LPG of data may include as many bits of data as the number of memory cells included in one PPG, Alternatively, a single memory cell may store two or more bits of data. Typically, this memory cell is called a Multi-Level Cell (MLC). One PPG including MLCs may store two or more logical LPG of data.

A single memory cell that stores two or more bits of data may be called a Multi-Level Cell (MLC). However, recently, as the number of bits of data stored in a single memory cell increases, the Multi-Level Cell (MLC) may refer to a memory cell storing two bits of data, a memory cell storing three or more bits of data is called a Triple-Level Cell (TLC), and a memory cell storing four or more bits of data is called a Quadruple-Level Cell (QLC). Various types of memory cells storing multiple bits of data, other than the memory cells described above, have been developed, and this embodiment may be applied to the memory device 100 storing two or more bits of data.

According to another embodiment, a memory block may have a three-dimensional structure. Each memory block may include a plurality of memory cells stacked over a substrate. The plurality of memory cells may be arranged in a +X direction, a +Y direction, and a +Z direction.

Figure 4:
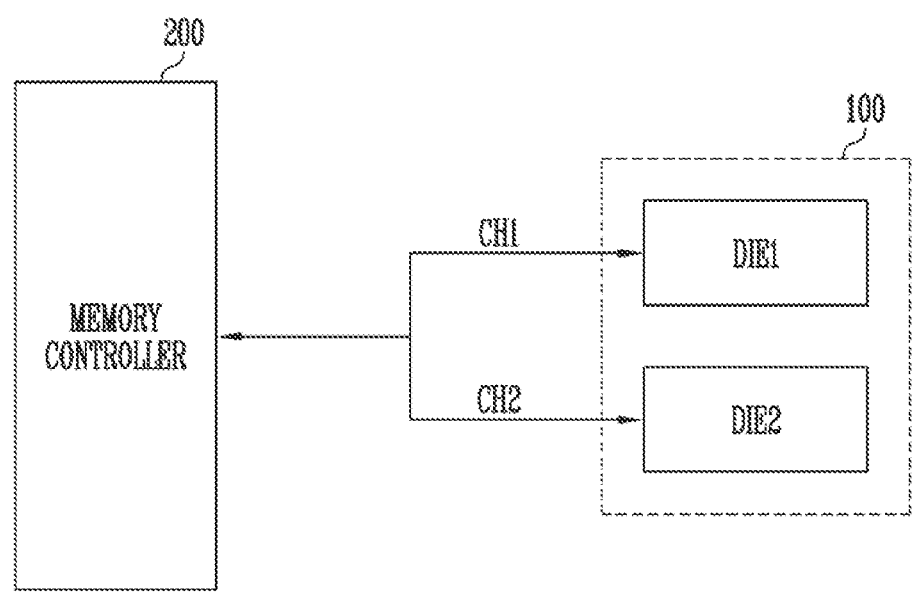
FIG. 4 is a diagram illustrating a plurality of dies included in the memory device shown in FIG. 1.

FIG. 4 is a diagram illustrating a plurality of dies included in the memory device 100 shown in FIG. 1.

Referring to FIG. 4, the memory device 100 may include a first die DIE1 and a second die DIE2, The first and second dies DIE1 and DIE2 may be coupled to the memory controller 200 through first and second channels CH1 and CH2, respectively. Each of the first and second dies DIE1 and DIE2 may include a plurality of planes. Each of the plurality of planes may include a plurality of memory blocks, Each of the plurality of memory blocks may include a plurality of pages. Each of the plurality of pages may include a plurality of memory cells.

According to an embodiment shown in FIG. 4, the memory device 100 includes two dies, that is, the first and second dies DIE1 and DIE2. However, according to another embodiment, the memory device 100 may include more than two dies.

According to an embodiment, a plurality of dies may perform operations independently of each other. In other words, the plurality of dies may perform operations simultaneously or at different times.

The memory controller 200 may control operations performed on the first and second dies DIE1 and DIE2 independently of each other through the channels CH1 and CH2, respectively. For example, the memory controller 200 may control an operation performed on the first die DIE1 through the first channel CH1 and an operation performed on the second die DIE2 through the second channel CH2.

Accordingly, the memory controller 200 may output the command CMD, an address, and data through respective channels to perform operations on the first and second dies DIE1 and DIE2. Operations may be performed on the first and second dies DIE1 and DIE2 based on the command CMD, the address, and the data received through the first and second channels CH1 and CH2. The operations performed on the first and second dies DIE1 and DIE2 may be a program (or write) operation, a read operation, or an erase operation. Data of the first and second dies DIE1 and DIE2 may be transferred to the memory controller 200 through the first and second channels CH1 and CH2, respectively.

When operations are performed on a plurality of dies in response to control of the memory controller 200, currents (power) may be consumed by the plurality of dies. Currents consumed by the plurality of dies, respectively, may vary depending on operations. For example, currents consumed during a program operation, a read operation, or an erase operation may vary. In addition, currents consumed during a precharge operation, a discharge operation, or a puke applying operation, included in the program operation, the read operation, or the erase operation, may vary.

According to an embodiment, when operations during which all of the plurality of dies consume a peak current are performed, reliability of a storage device may be deteriorated. In other words, because an amount of current consumed by the storage device becomes the maximum, it may be difficult to ensure the reliability of data stored in the storage device.

When it is predicted that operations during which all of a plurality of dies consume a peak current are performed, operations on dies except for one die are suspended until an operation on the one die is finished. However, this method may delay completion of operations and may be inefficient.

Accordingly, according to embodiments of the present disclosure, a method of operating dies may be provided. More specifically, according to the method of operating the dies, when all signals received from a plurality of dies are busy signals, busy periods of time are subdivided into sub-periods, and an operation of a die is suspended only during a sub-period when a peak current occurs.

Figure 5:
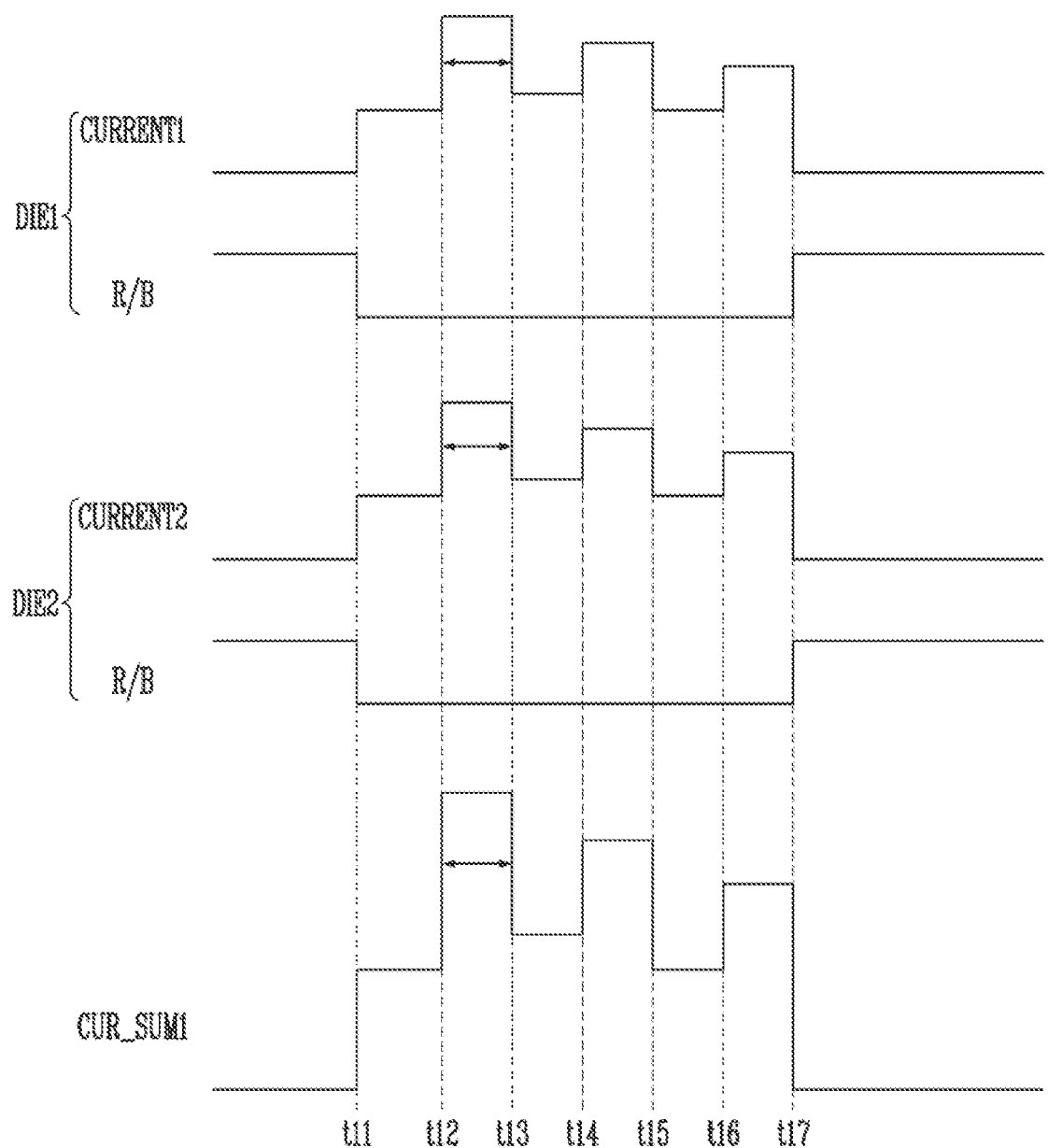
FIG. 5 is a diagram illustrating an amount of current consumed by each of two dies and an aggregate amount of current obtained by summing up the amounts of current consumed by the two dies.

FIG. 5 is a diagram illustrating an amount of current consumed by each of two dies and an aggregate amount of current obtained by summing up amounts of current consumed by the dies, FIG. 5 illustrates variations in amount of current consumed by each of the dies, the ready/busy signal R/B output from each of the dies, and an aggregate amount of current obtained by summing up amounts of current consumed by the first and second dies DIE1 and DIE2.

According to an embodiment, the first and second dies DIE1 and DIE2 may perform operations only during a period of time t11 to t17. In other words, each of a first current CURRENT1 indicating an amount of current consumed by the first die DIE1 and a second current CURRENT2 indicating an amount of current consumed by the second die DIE2 may have a non-zero value only during the period t11 to t17, and may be '0' for times outside of the period t11 to t17.

In addition, the ready/busy signals R/B output from the first and second dies DIE1 and DIE2 may be in a high state for times before t11 and times after t17, and may be in a low state during the period t11 to t17. In other words, the first and second dies DIE1 and DIE2 may be in a ready state before time t11 and the after time t17 and may be in a busy state only during the period t11 to t17.

As a result, during the times before t11 and during the times after t17, because the first and second dies DIE1 and DIE2 are in a standby state in which operations are not performed, a first aggregate current CUR_SUM1 obtained by summing up amounts of current consumed by the first and second dies DIE1 and DIE2 may be 0. However, the first aggregate current CUR_SUM1 during the period t11 to t17 may assume values obtained by summing up amounts of current consumed during each sub-period within the period t11 to t17.

In FIG. 5, it is assumed that a program operation is performed by each of the first and second dies DIE1 and DIE2. Accordingly, a precharge operation, a discharge operation, a program voltage applying operation, a verify voltage applying operation, a pass voltage applying operation, or the like may be performed during the period t11 to t17.

For example, the period t11 to t17 during which a program operation is performed may be subdivided into sub-periods t11 to t12, t12 to t13, t13 to t14, t14 to t15, t15 to t16, and t16 to t17 during which sub-operations of the program operation are performed. An amount of current consumed during each of the sub-periods may vary according to the sub-operation being performed in the sub-period. In other words, the first and second currents CURRENT1 and CURRENT2 may have various values which change from sub-period to sub-period according to the sub-operations performed by each die.

According to an embodiment, both the first and second dies DIE1 and DIE2 may consume a peak current during the sub-period t12 to t13 among busy sub-periods in the period t11 to t17. In other words, an operation which consumes a peak current, among the sub-operations included in the program operation, may be simultaneously performed on the first and second dies DIE1 and DIE2, and the first aggregate current CUR_SUM1 obtained by summing up amounts of current consumed by the first and second dies DIE1 and DIE2 may have the greatest value during the sub-period t12 to t13.

When a peak current is consumed by a plurality of dies during the same busy period, an operation on one of the dies may be suspended until the entire busy period finishes. However, when the operation on one of the dies is suspended until the busy period finishes, completion of the operations may be delayed and inefficient.

Figure 6:
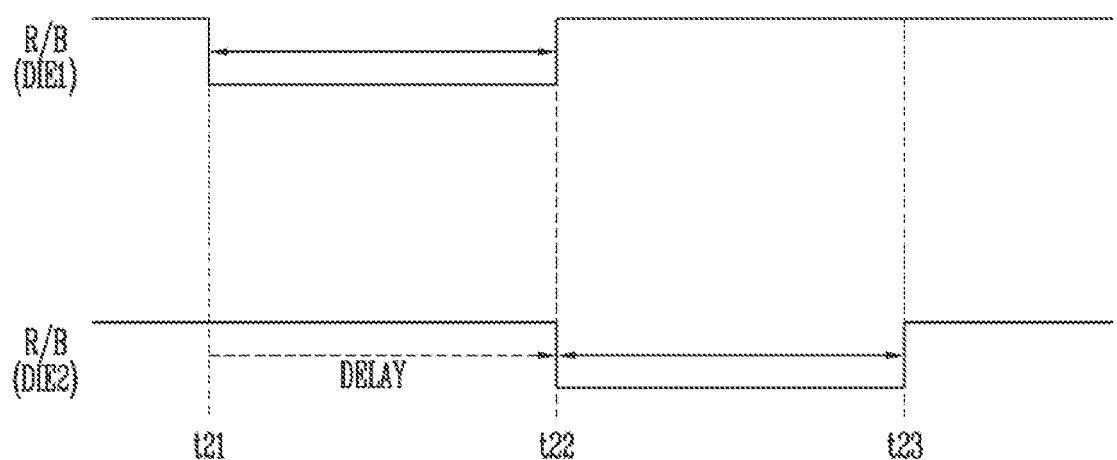
FIG. 6 is a diagram illustrating operations of two dies during a period when peak current overlap occurs.

FIG. 6 is a diagram illustrating operations of two dies during a period in which peak currents for the dies overlap.

FIG. 6 illustrates the ready/busy signals RIB output from the first and second dies DIE1 and DIE2.

It may be initially predicted that the first and second dies DIE1 and DIE2 are in a busy state during a period t21 to t22. In other words, the ready/busy signals R/B output from the first and second dies DIE1 and DIE2 may be in a low state during the period t21 to t22 and the ready/busy signals RIB output from the first and second dies DIE1 and DIE2 may be in a high state for times outside of the period t21 to t22.

However, a peak current may occur for both dies in the period t21 to t22. In other words, a period where an amount of current consumed by the first die DIE1 peaks may be the same period in which an amount of current consumed by the second die DIE2 peaks.

When peak currents for multiple dies occur in the same period, operations on dies except for one die may be delayed DELAY until a busy state of the one die finishes. Accordingly, the peak currents now occur in different periods.

In other words, referring to FIG. 6, when the peak current for each die occurs in the same period t21 to t22, the memory device 100 shown in FIG. 4 may suspend an operation on the second die DIE2 for the entire period t21 to t22 during which the first die DIE1 is in a busy state, may delay DELAY the operation to be performed on the second die DIE2, and may perform the delayed operation on the second die DIE2 during a later period t22 to t23. Accordingly, as shown in FIG. 6, the ready/busy signal R/B output from the second die DIE2 may be in a high state outside of the period t22 to t23 and in a low state during the period t22 to t23.

As a result, when the peak currents for the first and second dies DIE1 and DIE2 overlap with each other in the same period, the memory device 100 shown in FIG. 4 may suspend an operation of one die, that is, according to the embodiment shown in FIG. 6, the second DIE2, until a later period. The operation of the second die DIE2 may be suspended until a busy state of the first die DIE1 finishes.

When the operation of the second die DIE2 is suspended until the busy state of the first die DIE1 finishes, a delay time of the operation performed on the second die DIE2 may increase and the operation may be inefficient.

Figure 7:
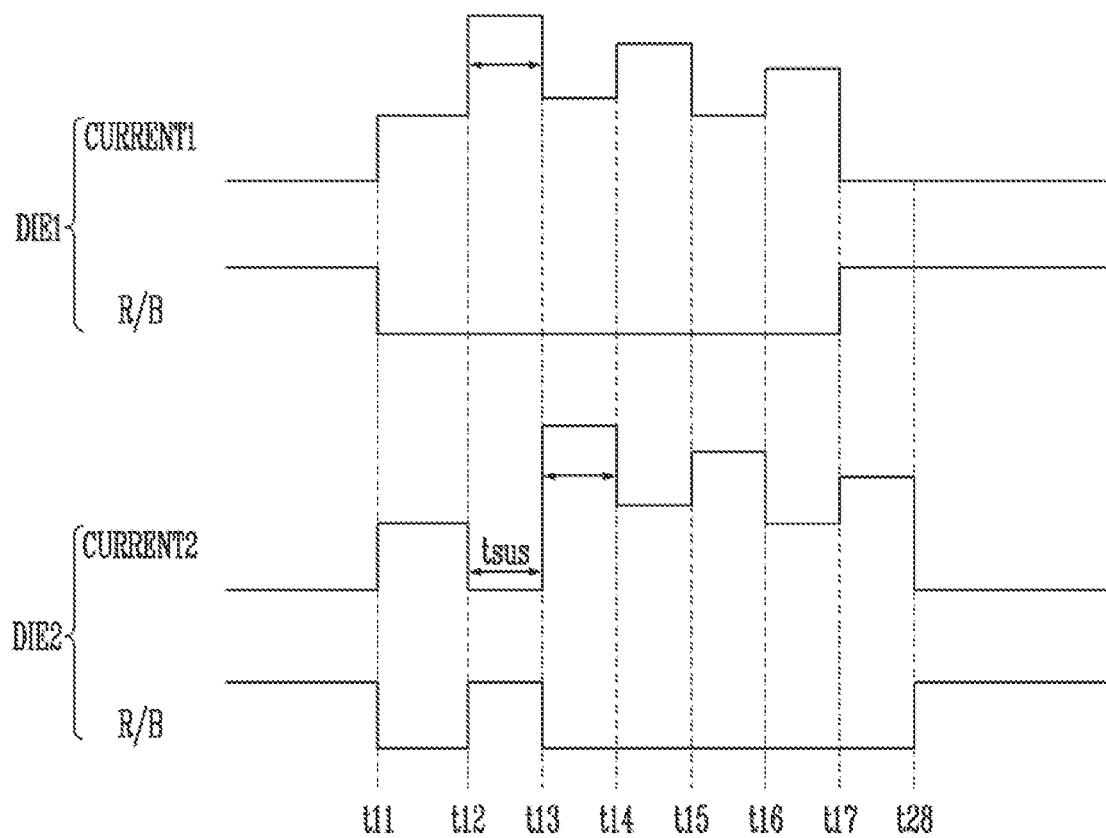
FIG. 7 is a diagram illustrating operations of two dies during a period when peak current overlap occurs according to an embodiment.

Accordingly, the present disclosure teaches a method of delaying an operation only during a sub-period in which a peak current occurs, FIG. 7 is a diagram illustrating the prevention of peak currents for different dies from occurring during the same sub-period, according to an embodiment.

Referring to FIGS. 5 and 7, FIG. 7 illustrates the implementation of a sub-period delay when the peak currents for different dies initially occur during the same sub-period, as shown in FIG. 5. In other words, the second current CURRENT2 consumed by the second die DIE2 and the ready/busy signal R/B output from the second die DIE2 which are illustrated in FIG. 7 correspond to an amount of current and a signal when the operation performed on the second die DIE2 shown in FIG. 5 is delayed.

According to an embodiment, the first current CURRENT1 consumed by the first die DIE1 and the ready/busy signal RIB output from the first die DIE1 are the same in FIGS. 5 and 7. However, because the sub-periods where the peak current occurs in the first and second dies DIE1 and DIE2 overlap with each other as shown in FIG. 5, the second current CURRENT2 consumed by the second die DIE2 and the ready/busy signal R/B output from the second die DIE2 illustrated in FIG. 5 may be different from the second current CURRENT2 consumed by the second die DIE2 and the ready/busy signal R/B output from the second die DIE2 illustrated in FIG. 7.

According to an embodiment, a sub-period where a peak current occurs in the first die DIE1 may overlap a sub-period where a peak current occurs in the second die DIE2. Because the periods where the peak current occurs overlap with each other, an operation of the second die DIE2 between the first and second dies DIE1 and DIE2 may be delayed. Alternatively, according to another embodiment, an operation of the first die DIE1 between the first and second dies DIE1 and DIE2 may be delayed.

Referring to FIG. 5, according to an embodiment, the peak current occurs in both the first and second dies DIE1 and DIE2 during the sub-period t12 to t13, the operation performed on the second die DIE2 may be suspended during the sub-period t12 to t13. In other words, the operation performed on the second die DIE2 may be delayed and performed later.

For example, the operation performed on the second die DIE2 may be suspended during the sub-period t12 to t13 and the ready/busy signal RIB output from the second die DIE2 may be in a high state. In other words, the ready/busy signal RIB indicating that the second die DIE2 is in a standby state may be output. Because the operation performed on the second die DIE2 is suspended, the second current CURRENT2 consumed by the second die DIE2 may be '0'. The suspended operation may be delayed as much as the time of the sub-period in which the peak current overlap occurs.

Referring to FIG. 7, a sub-period where the peak current occurs in the first and second dies DIE1 and DIE2 is t12 to t13, and the operation performed on the second die DIE2 may be suspended during the sub-period t12 to t13 (for a time t13 minus t12 tsus).

According to an embodiment, the operation delayed for the sub-period t12 to t13 may be performed during the period t13 to t14. In other words, the operation performed on the second die DIE2 may be suspended by the time of the sub-period in which the peak current overlap occurs and the suspended operation may resume later.

The sub-period in which the peak current occurs in the first die DIE1 is no longer the same sub-period in which the peak current occurs in the second die DIE2 as a consequence of the introduce sub-period delay described above. In other words, the sub-period in which the peak current occurs in the first die DIE1 continues to be t12 to t13, whereas the sub-period in which the peak current occurs in the second die DIE2 has been shifted to t13 to t14.

Accordingly, because the operation performed on the second die DIE2 is delayed, the ready/busy signal R/B output from the second die DIE2 may be in a low state during a sub-period t13 to t28. In other words, the operation may be performed on the second die DIE2 as much as the delayed time tsus and the ready/busy signal RIB in a low state may be output during a sub-period t17 to t28.

Thereafter, when the sub-periods where the peak current occurs in the first and second dies DIE1 and DIE2 overlap with each other again, an operation on one die between the first and second dies DIE1 and DIE2 may be suspended again.

As a result, when sub-periods where a peak current occurs in a plurality of dies overlap with each other, an operation on at least one die among the plurality of dies may be delayed as much as a time when the sub-periods overlap with each other and may then be performed, such that the overlap of the sub-periods where the peak current occurs may be mitigated. When the overlap of the sub-periods where the peak current occurs is mitigated, reliability of data stored in a storage device may be improved.

Figure 8:
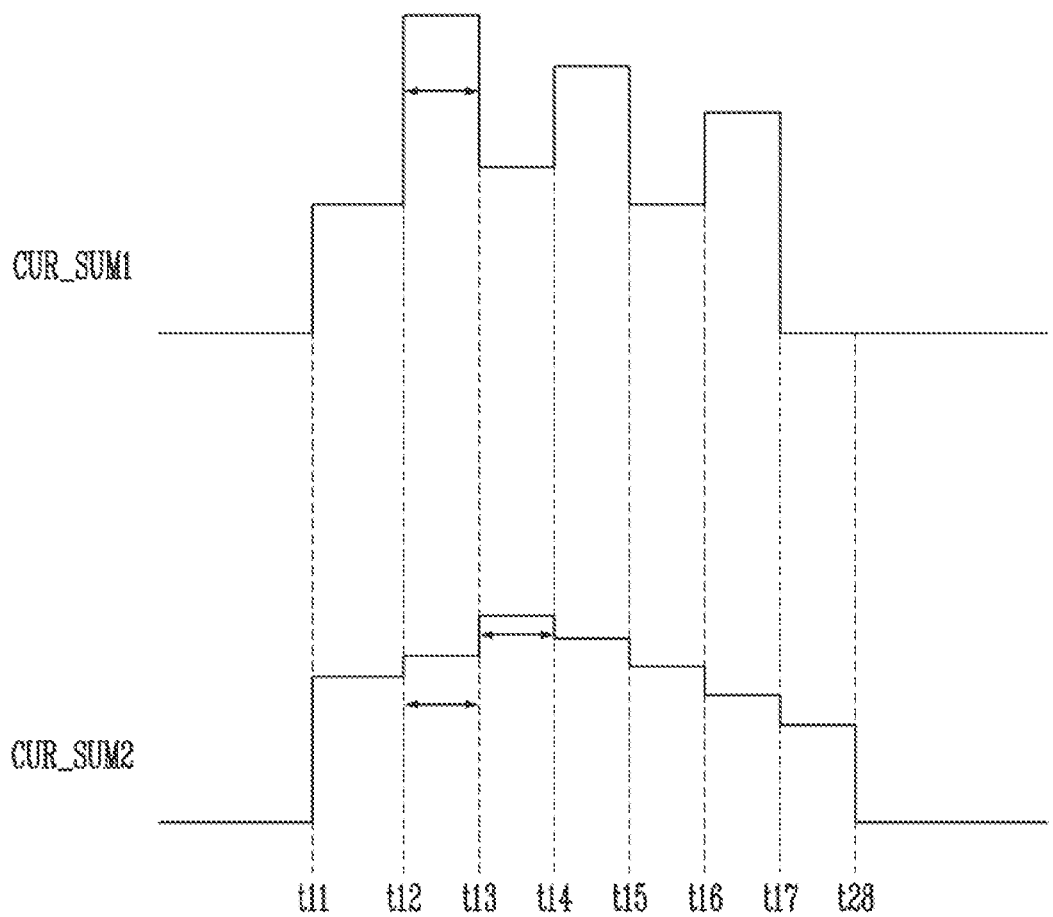
FIG. 8 is a diagram illustrating a comparison between an aggregate amount of current shown in FIG. 5 and an aggregate amount of current shown in FIG. 7.

FIG. 8 is a diagram illustrating comparison between an aggregate amount of current shown in FIG. 5 and an aggregate amount of current shown in FIG. 7.

Referring to FIGS. 5, 7, and 8, FIG. 8 illustrates the first aggregate current CUR_SUM1 shown in FIG. 5 and a second aggregate current CUR_SUM2 which is obtained by summing up the first current CURRENT1 and the second current CURRENT2 shown in FIG. 7. In other words, FIG. 8 illustrates the first aggregate current CUR_SUM1 which is the total amount of current consumed by the first and second dies DIE1 and DIE2 when an operation performed on the second die DIE2 is not delayed as shown in FIG. 5, and the second aggregate current CUR_SUM2 which is the total amount of current consumed by the first and second dies DIE1 and DIE2 when the operation performed on the second die DIE2 is delayed as shown in FIG. 7.

Referring to FIG. 5, the first aggregate current CUR_SUM1 may refer to the total amount of current consumed by the first and second dies DIE1 and DIE2 when an operation on one die between the first and second dies DIE1 and DIE2 is not delayed even when a period in which the sub-periods where the peak current occurs in the first and second dies DIE1 and DIE2 overlap exists.

According to an embodiment, because the operation on one die between the first and second dies DIE1 and DIE2 is not delayed, the first aggregate current CUR_SUM1 may have the maximum value during the period t12 to t13. In addition, a deviation in values of the first aggregate current CUR_SUM1 may be great depending on a sub-period.

However, referring to FIG. 7, the second aggregate current CUR_SUM2 may refer to the total amount of current consumed by the first and second dies DIE1 and DIE2 when an operation on the second die DIE2 is delayed because the sub-period where the peak current occurs in the first die DIE1 overlaps the period where the peak current occurs in the second die DIE2.

According to an embodiment, because the operation performed on the second die DIE2 is delayed, the second aggregate current CUR_SUM2 may have the maximum value during the sub-period t13 to t14, not the sub-period t12 to t13. In addition, a deviation in values of the second aggregate current CUR_SUM2 may be small depending on a period.

Figure 9:
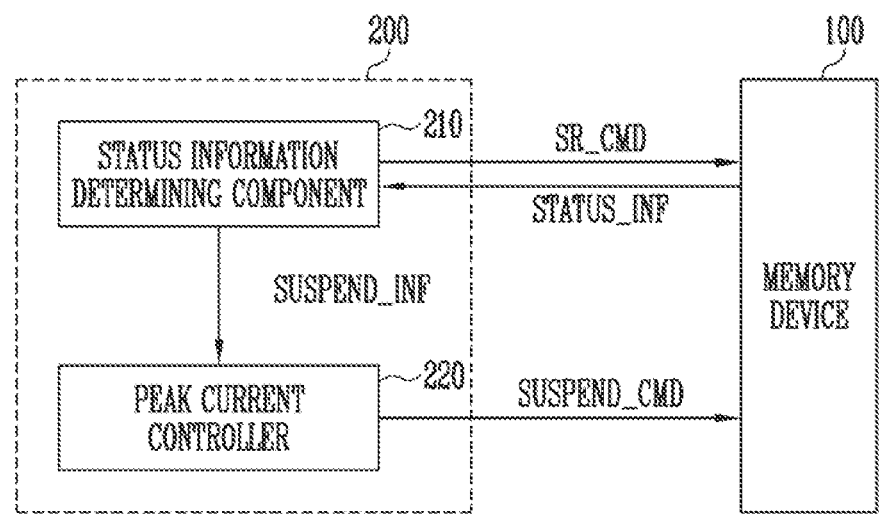
FIG. 9 is a diagram illustrating a configuration of a memory controller shown in FIG. 1 and a process of outputting a suspend command.

FIG. 9 is a diagram illustrating a configuration of the memory controller 200 shown in FIG. 1 and a process of outputting a suspend command.

The memory controller 200 shown in FIG. 9 may include the status information determining component 210 and the peak current controller 220.

According to an embodiment, the status information determining component 210 may receive the ready/busy signal R/B from each of the plurality of dies included in the memory device 100. The ready/busy signal R/B may indicate whether a die is in a busy state where the die performs an operation or a ready state where the die does not perform the operation.

According to an embodiment, when all the ready/busy signals R/B received from the plurality of dies, respectively, indicate the busy state, that is, the low state, the status information determining component 210 may output a status read command SR_CMD to the memory device 100. According to embodiments, the status read command SR_CMD may be output to determine the amount of current consumed by each die and whether the periods where the peak current occurs overlap. In other words, the status read command SR_CMD may instruct that information about an amount of current consumed by a die should be output.

The memory device 100 may output status information STATUS_INF in response to the status read command SR_CMD, The status information STATUS_INF may include information about an amount of current consumed by each die when all the plurality of dies are in the busy state.

For example, a period during which the busy state is maintained may be divided into a plurality of sub-periods and information about an amount of current consumed per sub-period and by each die may be included in the status information STATUS_INF. In other words, the memory device 100 may divide a busy period, that is, the period during which the busy state is maintained, into the plurality of sub-periods and may output information about an amount of current consumption corresponding to each of the plurality of sub-periods per die.

According to an embodiment, the period may be divided into the plurality of sub-periods according to a predetermined length or a predetermined operation. In other words, the period during which the busy state is maintained may be divided into sub-periods each of which has a predetermined length, or may be divided according to a busy sub-operation (for example, a precharge operation, a discharge operation, or a voltage applying operation).

According to an embodiment, the status information determining component 210 may receive the status information STATUS_INF. The status information determining component 210 may determine whether to suspend an operation on at least one die among the plurality of dies included in the memory device 100 and a time for which the operation is suspended based on the status information STATUS_INF.

For example, when it is determined based on the status information STATUS_INF, sub-periods in which a peak current occurs in the plurality of dies overlap each other, the status information determining component 210 may determine to suspend the operation on at least one die among the plurality of dies. Furthermore, the status information determining component 210 may determine to suspend the operation for a sub-period during which the peak current overlap occurs.

When the status information determining component 210 determines to suspend the operation on at least one die among the plurality of dies included in the memory device 100, the status information determining component 210 may generate suspend information SUSPEND_INF. The suspend information SUSPEND_INF may include information about a die on which the operation is suspended and information about a sub-period during which the operation on the corresponding die is suspended. The status information determining component 210 may output the generated suspend information SUSPEND_INF to the peak current controller 220.

The peak current controller 220 may output the suspend command SUSPEND_CMD to the memory device 100 based on the suspend information SUSPEND_INF. In other words, the peak current controller 220 may control the corresponding die to suspend an operation to be performed on the corresponding die during a suspension sub-period included in the suspend information SUSPEND_INF, that is, the sub-period during which the operation on the corresponding die is suspended.

According to an embodiment, the memory device 100 may receive the suspend command SUSPEND_CMD from the peak current controller 220 and suspend the operation on the corresponding die based on the suspend command SUSPEND CMU.

After the operation on the corresponding die is suspended in response to the suspend command SUSPEND_CMD, when the suspension sub-period is finished, the peak current controller 220 may output a resume command to resume the suspended operation.

Figure 10:
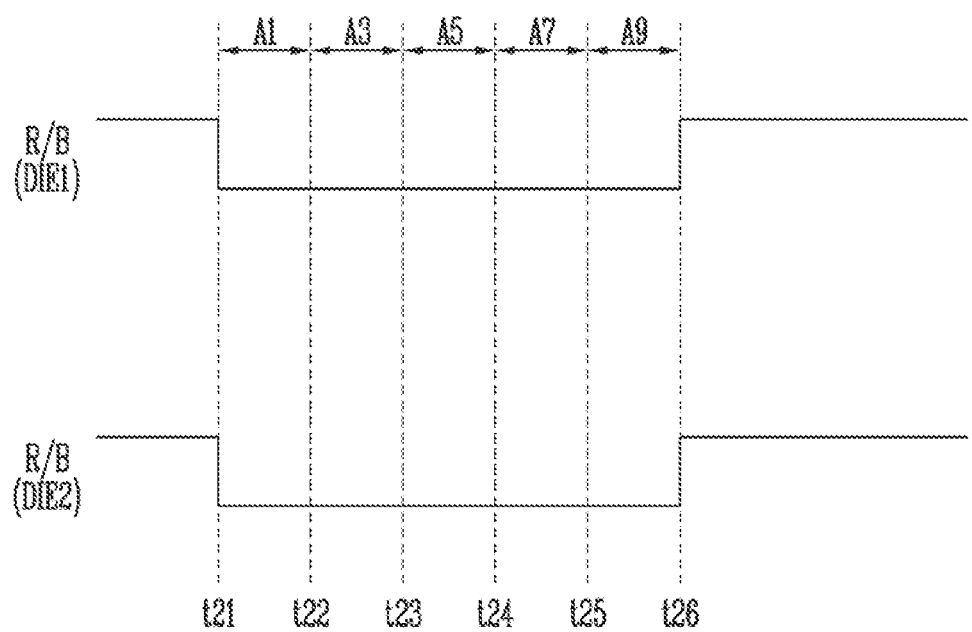
FIG. 10 is a diagram illustrating a method of subdividing overlapping busy periods.

FIG. 10 is a diagram illustrating a method of subdividing overlapping busy periods.

FIG. 10 illustrates a plurality of sub-periods included in the status information STATUS_INF when all the ready/busy signals R/B output from the plurality of dies included in the memory device 100 shown in FIG. 9 indicate the busy state.

In FIG. 10, it is assumed that the number of dies included in the memory device 100 shown in FIG. 9 is two. In other words, in FIG. 10, it is assumed that the memory device 100 shown in FIG. 9 includes the first and second dies DIE1 and DIE2. According to another embodiment, the memory device 100 shown in FIG. 9 may include more than two dies.

According to an embodiment, all the ready/busy signals R/B output frog the first and second dies DIE1 and DIE2 may indicate the busy state. In other words, the first and second dies DIE1 and DIE2 may be in the busy state at the same time.

Referring to FIG. 10, both the first and second dies DIE1 and DIE2 may be in the busy state in which the first and second dies DIE1 and DIE2 perform operations during a period t21 to t26.

The status information determining component 210 shown in FIG. 9 may output the status read command SR_CMD to the memory device 100 shown in FIG. 9 and the memory device 100 shown in FIG. 9 may output the status information STATUS_INF corresponding to the status read command SR_CMD to mitigate the overlap of peak currents the first and second dies DIE1 and DIE2. The status information STATUS_INF may divide the busy period into a plurality of sub-periods and may include information about an amount of current consumed during the plurality of sub-periods.

In FIG. 10, the busy period of each of the first and second dies DIE1 and DIE2 may be divided into sub-periods A1 to A9, The busy period may be divided into the sub-periods A1 to A9 according to the length of a predetermined sub-period or the length of a predetermined operation (for example, a precharge operation, a discharge operation, or a voltage applying operation).

According to an embodiment, the sub-period A1 may correspond to the period t21 to t22, the sub-period A3 to the sub-period t22 to t23, the sub-period A5 to the sub-period t23 to t24, the sub-period A7 to the period t24 to t25, and the sub-period A9 to the period t25 to t26, Accordingly, the memory device 100 shown in FIG. 9 may generate information about an amount of current consumed during each sub-period in response to the status read command SR_CMD and may output the generated information as the status information STATUS_INF.

A method in which the memory device 100 shown in FIG. 9 outputs the status information STATUS_INF is described with reference to FIGS. 11A and 11B.

Figures 11A, 11B:
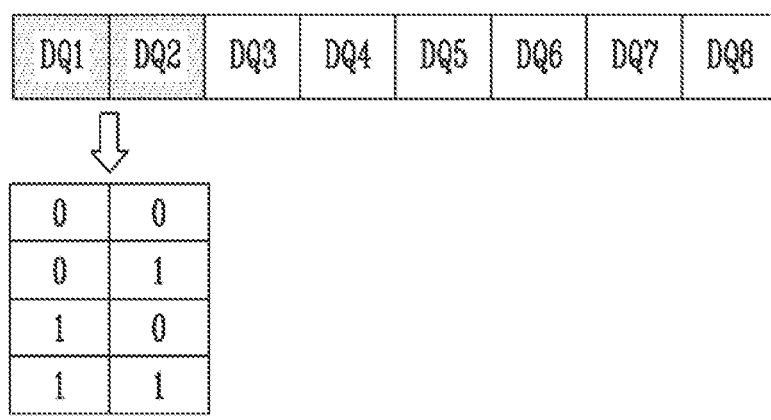
FIGS. 11A and 11B are tables showing status information output from a memory device.

FIGS. 11A and 11B are diagrams illustrating the status information STATUS_INF output from the memory device 100.

Referring to FIGS. 11A and 11B, FIG. 11A illustrates a binary number BINARY NUMBER corresponding to an amount of current consumption CURRENT and FIG. 11B illustrates a method of outputting the status information STATUS_INF.

According to an embodiment, the amount of current consumption CURRENT may have a value of from 0 to 100 and may be a value which belongs to one range among four ranges shown in FIG. 11A. A unit of amount of current consumption CURRENT may be a milliamperes (mA), microamperes (pA), or nanoamperes (nA).

In FIG. 11A, the amount of current consumption CURRENT may belong to one range among predetermined ranges.

According to an embodiment, when the amount of current consumption CURRENT increases, a range may be subdivided into more ranges. In other words, to minimize an overlap of periods where the peak current occurs, when the amount of current consumption CURRENT increases, a range may be subdivided into more ranges.

Referring to the example illustrated by FIG. 11A, when the amount of current consumption CURRENT falls within a range of 0 to 50 units, the binary number BINARY NUMBER corresponding to the amount of current consumption CURRENT may be '00'. When the amount of current consumption CURRENT falls within a range of 51 to 75 units, the binary number BINARY NUMBER corresponding to the amount of current consumption CURRENT may be '01'. When the amount of current consumption CURRENT falls within a range of 76 to 90 units, the binary number BINARY NUMBER corresponding to the amount of current consumption CURRENT may be '10'. When the amount of current consumption CURRENT falls within a range of 91 to 100 units, the binary number BINARY NUMBER corresponding to the amount of current consumption CURRENT may be '11'.

According to another embodiment, when the range to which the amount of current consumption CURRENT belongs is divided into five or more ranges, the binary number BINARY NUMBER for indicating the corresponding amount of current consumption CURRENT may be one of '000', '001', '010', '011', '100', '101', '110', and '111'. In other words, when a range, to which the amount of current consumption CURRENT belongs, is subdivided into more ranges, the number of bits for indicating the corresponding amount of current consumption CURRENT may increase.

Referring to FIG. 11B, the status information STATUS_INF is expressed in eight bits and may be output to the memory controller 200 shown in FIG. 9 through input/output pins DQ1 to DQ8 coupling the memory device 100 shown in FIG. 9 to the memory controller 200 shown in FIG. 9. In other words, the eight bits indicating the status information STATUS_INF may be output through the input/output pins DQ1 to DQ8.

In addition, during a busy period of the plurality of dies included in the memory device 100 shown in FIG. 9, the busy period may be divided into sub-periods to output the status information STATUS_INF per sub-period. In other words, when bits indicating the amount of current consumption CURRENT corresponding to one sub-period among the sub-periods are output through the input/output pins DC21 to DC28, bits indicating the amount of current consumption CURRENT corresponding to a sub-period subsequent to the one sub-period may be output.

According to an embodiment, when an amount of current consumed by a die belongs to a range of 0 to 50, the binary number BINARY NUMBER corresponding to the amount of current consumption CURRENT may be '00'. Accordingly, the memory device 100 shown in FIG. 9 may output '0' through the input/output pin DQ1 and '0' through the input/output pin DQ2.

According to an embodiment, when an amount of current consumed by a die belongs to a range of 51 to 75, the binary number BINARY NUMBER corresponding to the amount of current consumption CURRENT may be '01', '0' may be output through the input/output pin DQ1, and '1' may be output through the input/output pin DQ2. When an amount of current consumed by a die belongs to a range of 76 to 90, the binary number BINARY NUMBER corresponding to the amount of current consumption CURRENT may be '10', '1' may be output through the input/output pin DQ1, and '0' may be output through the input/output pin DQ2. When an amount of current consumed by a die belongs to a range of 91 to 100, the binary number BINARY NUMBER corresponding to the amount of current consumption CURRENT may be '11', '1' may be output through the input/output pin DQ1, and may be output through the input/output pin DQ2.

According to an embodiment, information indicating a ready/busy state of a die and/or information indicating whether an operation performed on a die has passed or failed may be expressed by the remaining bits except for two bits for indicating an amount of current consumed by a die among the eight bits for indicating the status information STATUS_INF.

According to another embodiment, when a range to which the amount of current consumption CURRENT belongs is divided into five or more ranges, the amount of current consumption CURRENT may be expressed by three or more bits among the eight bits for indicating the status information STATUS_INF.

FIG. 12 is a diagram illustrating a method of determining whether sub-periods in which a peak currents occur overlap based on the status information STATUS_INF. For example, if a peak current for each of DIE 1 and DIE 2 occur in the same sub-period.

Referring to FIGS. 10, 11A, 11B, and 12, the first column of a table shown in FIG. 12 may indicate the sub-periods A1 to A9 shown in FIG. 10, the second column may indicate binary numbers corresponding to amounts of current consumed by the first die DIE1 during the sub-periods of A1 to A9 shown in FIG. 10, respectively, and the third column may indicate binary numbers corresponding to amounts of current consumed by the second die DIE2 during the sub-periods of A1 to A9 shown in FIG. 10, respectively.

According to an embodiment, the first and second dies DIE1 and DIE2 may be in a busy state during the sub-periods A1 to A9. The busy state of the first and second dies DIE1 and DIE2 may be divided into the sub-periods A1 to A9 and amounts of current consumed by the first and second dies DIE1 and DIE2 during each of the sub-periods A1 to A9 may be output as the status information STATUS_INF to the memory controller 200 shown in FIG. 9.

The memory controller 200 shown in FIG. 9 may determine whether sub-periods where a peak current occurs overlap with each other based on the status information STATUS_INF received from the memory device 100 shown in FIG. 9.

For example, because a binary number corresponding to an amount of current consumed by the first die DIE1 during the sub-period A1 is '11' and a binary number corresponding to an amount of current consumed by the second die DIE2 during the sub-period A1 is '11', sub-periods where a peak current occurs in the first and second dies DIE1 and DIE2 may overlap during the period A1, In other words, because both the amounts of current consumed by the respective dies are the binary numbers corresponding to the range which indicates the maximum amount of current consumption shown in FIG. 11A, the peak current in the first die DIE1 and the peak current in the second die DIE2 may occur at the same time during the sub-period A1.

Accordingly, the memory controller 200 shown in FIG. 9 may output, to the memory device 100 shown in FIG. 9, a suspend command for instructing the memory device 100 shown in FIG. 9 to suspend an operation on one die between the first and second dies DIE1 and DIE2 as much as the time corresponding to the sub-period A1.

Figure 13:
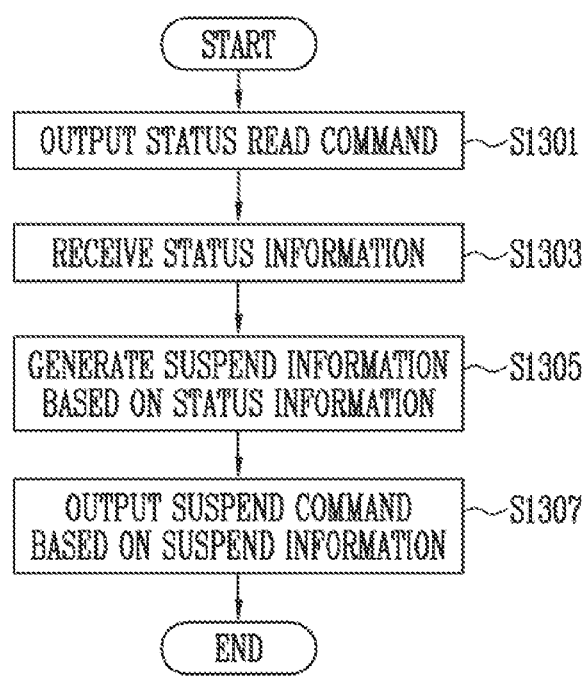
FIG. 13 is a diagram illustrating an operation of a memory controller according to an embodiment.

When the suspend command is output to the memory device 100 shown in FIG. 9, the memory device 100 shown in FIG. 9 may suspend the operation of one die between the first and second dies DIE1 and DIE2 as much as the time corresponding to the sub-period A1 in response to the suspend command, FIG. 13 is a diagram illustrating an operation of a memory controller according to an embodiment.

Referring to FIG. 13, at step S1301, when a memory controller receives busy signals from all of a plurality of dies, the memory controller may output a status read command to each of the dies. The status read command may be output to determine an amount of current consumed by each of the dies and whether sub-periods where a peak current occurs overlap. In other words, the status read command may instruct a die to output information about an amount of current consumed by the die.

At step S1303, the memory controller may receive status information corresponding to the status read command from a memory device. The status information may include information about an amount of current consumed by each of the dies when all of the plurality of dies are in a busy state. Furthermore, the status information may divide a period during which the busy state is maintained into a plurality of sub-periods and may include information about an amount of current consumed per sub-period and by each of the dies.

At step S1305, the memory controller may generate suspend information based on the status information. For example, when the amount of current consumption corresponding to a predetermined sub-period among the plurality of sub-periods has the maximum value in both first and second dies, the memory controller may generate the suspend information. In other words, when sub-periods where a peak current occurs in the first and second dies overlap, the memory controller may generate the suspend information. The suspend information may include information about a die of which operation is suspended between the first and second dies, and information about a time for which the operation is suspended. The time for which the operation is suspended may correspond to a sub-period during which the peak currents for the first and second dies overlap.

However, when the amount of current consumption corresponding to a predetermined sub-period among the plurality of sub-periods is not a peak current in either of the first and second dies, the memory controller might not generate the suspend information.

At step S1307, the memory controller may output a suspend command based on the suspend information. In other words, because the suspend information includes information about a die of which operation is suspended among the plurality of dies and information about a time for which the operation is suspended, the memory controller may output, to the memory device, the suspend command instructing the corresponding die to suspend the operation as much as predetermined time based on the suspend information.

Figure 14:
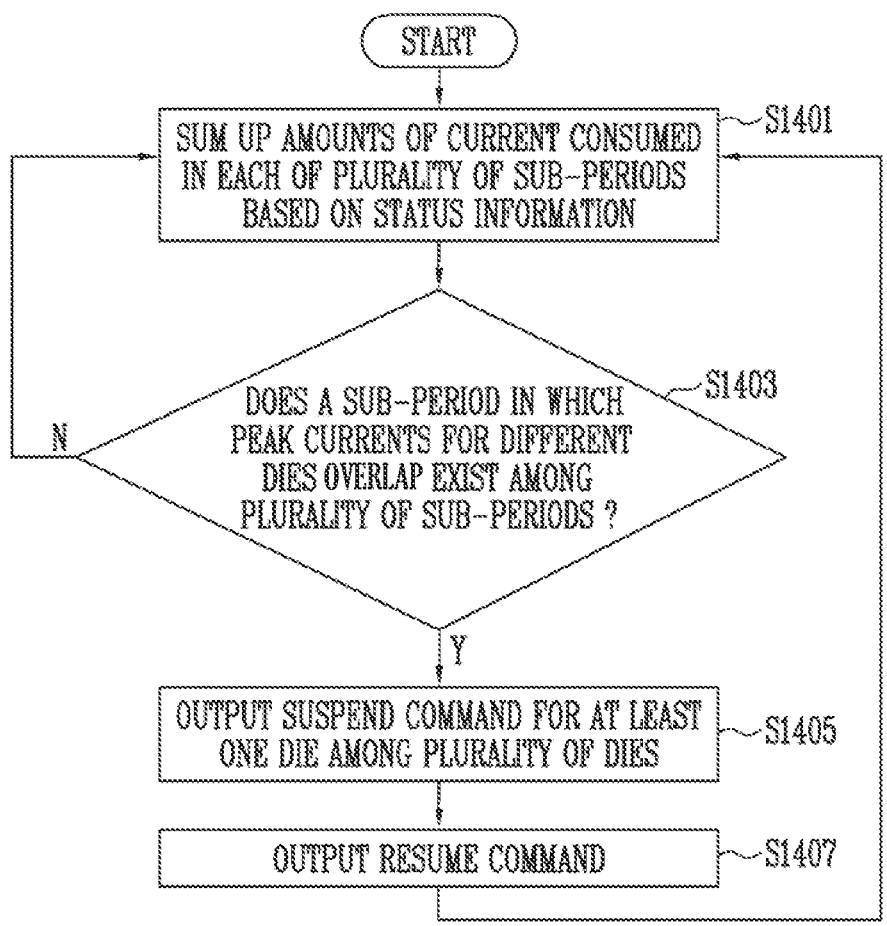
FIG. 14 is a diagram illustrating an operation of a memory controller according to an embodiment.

FIG. 14 is a diagram illustrating an operation of a memory controller according to an embodiment.

Referring to FIG. 14, at step S1401, a memory controller may sum up amounts of current consumed by a plurality of dies per sub-period based on status information received from a memory device. The status information may include information about an amount of current consumed by each die when all of the plurality of dies are in a busy state. Furthermore, the status information may divide a period during which the busy state is maintained into a plurality of sub-periods and may include information about an amount of current consumed per sub-period and by each of the dies.

At step S1403, the memory controller may determine whether there exists a sub-period in which peak currents for different dies overlap, among the plurality of sub-periods. In other words, the memory controller may sum up amounts of current consumed by the plurality of dies per sub-period and may determine whether the sub-periods where a peak current occurs in the respective dies overlap based on a result obtained by summing up the amounts of current consumption.

When a period, during which the sub-periods where a peak current occurs in the plurality of dies overlap, does not exist (S1403: N), the process flow may proceed to step S1401 again and the memory controller may sum up amounts of current consumed per sub-period by receiving the status information when all the dies included in the memory device become a busy state.

However, when a period, during which the sub-periods where a peak current occurs in the plurality of dies overlap, exists (S1403: Y), the process flow may proceed to step S1405.

At step S1405, the memory controller may output a suspend command for at least one die among the plurality of dies. In other words, the suspend command for instructing that an operation on at least one die should be suspended may be output to mitigate the periods where the peak current occurs in the plurality of dies from overlapping in the same sub-period. A time for which the operation is suspended may correspond to a sub-period during which the peak currents overlap.

At step S1407, the memory controller may output a resume command for resuming the suspended operation on the die. In other words, because the suspended operation should be resumed on the die of which operation was suspended by the suspend command when a time to suspend the operation has passed, the memory controller may output the resume command to the memory device.

Figure 15:
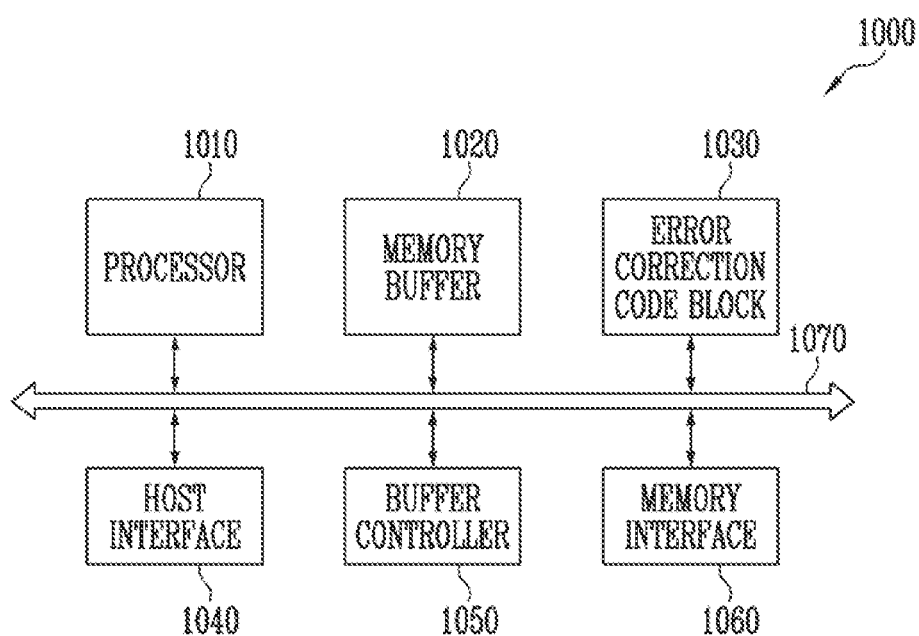
FIG. 15 is a diagram Illustrating another embodiment of a memory controller shown in FIG. 1.

FIG. 15 is a diagram illustrating another embodiment of a memory controller shown in FIG. 1.

A memory controller 1000 may be coupled to a host and a memory device. The memory controller 1000 may access the memory device in response to a request from the host. For example, the memory controller 1000 may control write, read, erase, and background operations of the memory device. The memory controller 1000 may provide an interface between the memory device and the host. The memory controller 1000 may run firmware for controlling the memory device.

Referring to FIG. 15, the memory controller 1000 may include a processor 1010, a memory buffer 1020, an error correction code (ECC) block 1030, a host interface 1040, a buffer controller 1050, a memory interface 1060, and a bus 1070.

The bus 1070 may provide a channel between components of the memory controller 1000.

The processor 1010 may control overall operation of the memory controller 1000 and may perform a logical operation. The processor 1010 may communicate with an external host through the host interface 1040 and communicate with the memory device through the memory interface 1060. Further, the processor 1010 may communicate with the memory buffer 1020 through the buffer controller 1050. The processor 1010 may control operations of the storage device by using the memory buffer 1020 as operational memory, cache memory or buffer memory.

The processor 1010 may perform a function of a flash translation layer (FTL). The processor 1010 may translate a logical block address (LBA), provided by the host, into a physical block address (PBA) through the FTL. The FTL may receive the LBA and translate the received LBA into the PBA by using a mapping table. There may be various address mapping methods for the FTL depending on a mapping unit. Typical address mapping methods include a page mapping method, a block mapping method and a hybrid mapping method.

The processor 1010 may randomize data received from the host. For example, the processor 1010 may use a randomizing seed to randomize data received from the host. The randomized data may be provided, as data to be stored, to the memory device and may be programmed in a memory cell array.

According to an embodiment, the processor 1010 may run software or firmware to perform randomizing and derandomizing operations.

According to an embodiment, the processor 1010 may determine an amount of current consumed by each of the plurality of dies included in the memory device 100 shown in FIG. 9 based on status information received from the memory device 100 shown in FIG. 9, For example, the status information may be output from the memory device 100 shown in FIG. 9 in response to a status response command that is output when all of the dies included in the memory device 100 shown in FIG. 9 are in a busy state. The status information may divide a busy period of each die into a plurality of sub-periods having the same length and may include information about an amount of current consumed by each die corresponding to each of the plurality of sub-periods.

The processor 1010 may determine whether sub-periods where a peak current occurs in the plurality of dies overlap based on the status information. In other words, the processor 1010 may determine whether the maximum current is consumed in all dies included in the memory device 100 shown in FIG. 9 and whether sub-periods where the maximum current consumed by the dies overlap.

According to an embodiment, when the sub-periods where the peak current occurs in the plurality of dies overlap, the processor 1010 may output a suspend command. The suspend command may instruct that an operation on at least one die among the plurality of dies should be delayed as much as a sub-period in which the periods where the peak current occurs in the plurality of dies overlap, when the periods where the peak current occurs in the plurality of dies overlap.

The memory device 100 shown in FIG. 9 may delay an operation on the corresponding die as much as a sub-period in which the sub-periods where the peak current occurs in the plurality of dies overlap in response to the suspend command.

The memory buffer 1020 may serve as operational memory, cache memory, or buffer memory of the processor 1010. The memory buffer 1020 may store codes and commands executed by the processor 1010. The memory buffer 1020 may store data processed by the processor 1010. The memory buffer 1020 may include Static RAM (SRAM) or Dynamic RAM (DRAM).

The ECC block 1030 may perform error correction. The ECC block 1030 may perform ECC encoding based on data to be written to the memory device through the memory interface 1060. The ECC-encoded data may be transferred to the memory device through the memory interface 1060. The ECC block 1030 may perform ECC decoding based on data received from the memory device through the memory interface 1060. For example, the ECC block 1030 may be included as the component of, and disposed in, the memory interface 1060.

The host interface 1040 may communicate with the external host under the control of the processor 1010. The host interface 1040 may perform communication using at least one of various communication methods such as a Universal Serial Bus (USB), Serial AT Attachment (SATA), Serial Attached SCSI (SAS), a High Speed Interchip (HSIC), Small Computer System Interface (SCSI), Peripheral Component Interconnection (PCI), PCI express (PCIe), NonVolatile Memory express (NVMe), Universal Flash Storage (UFS), Secure Digital (SD), a Multi-Media Card (MMC), an embedded MMC (eMMC), a Dual In-line Memory Module (DIMM), a Registered DIMM (RDIMM), and/or a Load Reduced DIMM (LRDIMM).

The buffer controller 1050 may control the memory buffer 1020 under the control of the processor 1010.

The memory interface 1060 may communicate with the memory device under the control of the processor 1010. The memory interface 1060 may communicate commands, addresses, and data with the memory device through channels.

The memory controller 1000 does not necessarily include the memory buffer 1020 and the buffer controller 1050 in all embodiments. Either or both of these components may be provided separately, or either or both of their functions may be performed by one or more other components in the memory controller 1000.

For example, the processor 1010 may control the operations of the memory controller 1000 using codes. The processor 1010 may load codes from a nonvolatile memory device (e. g., Read Only Memory (ROM)) provided in the memory controller 1000. In another example, the processor 1010 may load codes from the memory device through the memory interface 1060.

For example, the bus 1070 of the memory controller 1000 may be divided into a control bus and a data bus. The data bus may transfer data in the memory controller 1000, and the control bus may transfer control information such as commands and addresses in the memory controller 1000. The data bus and the control bus may be isolated from each other so as not to interfere with, nor influence, each other. The data bus may be coupled to the host interface 1040, the buffer controller 1050, the ECC block 1030, and the memory interface 1060. The control bus may be coupled to the host interface 1040, the processor 1010, the buffer controller 1050, the memory buffer 1020, and the memory interface 1060, FIG. 16 is a block diagram illustrating a memory card system 2000 to which a storage device is applied according to an embodiment.

Figure 16:
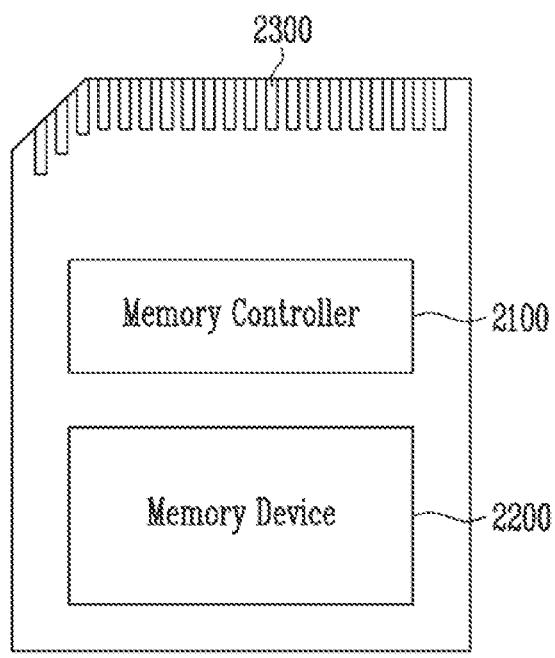
FIG. 16 is a block diagram Illustrating a memory card system to which a storage device is applied according to an embodiment.

Referring to FIG. 16, the memory card system 2000 may include a memory controller 2100, a memory device 2200 and a connector 2300.

The memory controller 2100 may be coupled to the memory device 2200. The memory controller 2100 may access the memory device 2200, For example, the memory controller 2100 may control read, write, erase, and background operations of the memory device 2200, The memory controller 2100 may provide an interface between the memory device 2200 and a host. The memory controller 2100 may run firmware for controlling the memory device 2200. The memory device 2200 may be configured in the same manner as the memory device 100 shown in FIG. 1 described above with reference to FIG. 1.

For example, the memory controller 2100 may include components, such as Random Access Memory (RAM), a processing unit, a host interface, a memory interface, and an ECC block.

The memory controller 2100 may communicate with an external device through the connector 2300. The memory controller 2100 may communicate with the external device (e.g., a host) in accordance with a predetermined communication protocol. For example, the memory controller 2100 may communicate with the external device through at least one of various communication protocols such as Universal Serial Bus (USB), Multi-Media Card (MMC), embedded MMC (eMMC), peripheral component interconnection (PCI), PCI-express (PCI-E), Advanced Technology Attachment (ATA), Serial-ATA (SATA), Parallel-ATA (DATA), small computer system interface (SCSI), enhanced small disk interface (ESDI), Integrated Drive Electronics (IDE), Firewire, Universal Flash Storage (UFS), WiFi, Bluetooth, and/or NonVolatile Memory express (NVMe) protocols. For example, the connector 2300 may be defined by at least one of the above-described various communication protocols.

For example, the memory device 2200 may be embodied as one of various nonvolatile memory devices, such as an Electrically Erasable and Programmable ROM (EEPROM), NAND flash memory, NOR flash memory, Phase-change RAM (PRAM), Resistive RAM (ReRAM), Ferroelectric RAM (FRAM), and a Spin-Torque Magnetic RAM (STT-MRAM).

The memory controller 2100 and the memory device 2200 may be integrated into a single semiconductor device to form a memory card. For example, the memory controller 2100 and the memory device 2200 may be integrated into a single semiconductor device and form a memory card, such as personal computer memory card international association (PCMCIA), a compact flash card (CF), a smart media card (SM or SMC), a memory stick, a multimedia card (MMC, RS-MMC, MMCmicro, or eMMC), a secure digital (SD) card (SD, miniSD, microSD, or SDHC), and universal flash storage (UFS).

According to an embodiment, the memory controller 2100 may determine an amount of current consumed by each of a plurality of dies included in the memory device 2200 based on status information received from the memory device 2200. For example, the status information may be output from the memory device 2200 in response to a status response command that is output when all of the dies included in the memory device 2200 are in a busy state. The status information may divide a busy period of each die into a plurality of sub-periods having the same length and may include information about an amount of current consumed by each die corresponding to each of the plurality of sub-periods.

The memory controller 2100 may determine whether sub-periods where a peak current occurs in the plurality of dies overlap based on the status information. In other words, the memory controller 2100 may determine whether the maximum current is consumed in all dies included in the memory device 2200 and whether sub-periods where the maximum current consumed by the dies overlap.

According to an embodiment, when the sub-periods where the peak current occurs in the plurality of dies overlap, the memory controller 2100 may output a suspend command. The suspend command may instruct that an operation on at least one die among the plurality of dies should be delayed as much as a sub-period in which the peak currents overlap.

Figure 17:
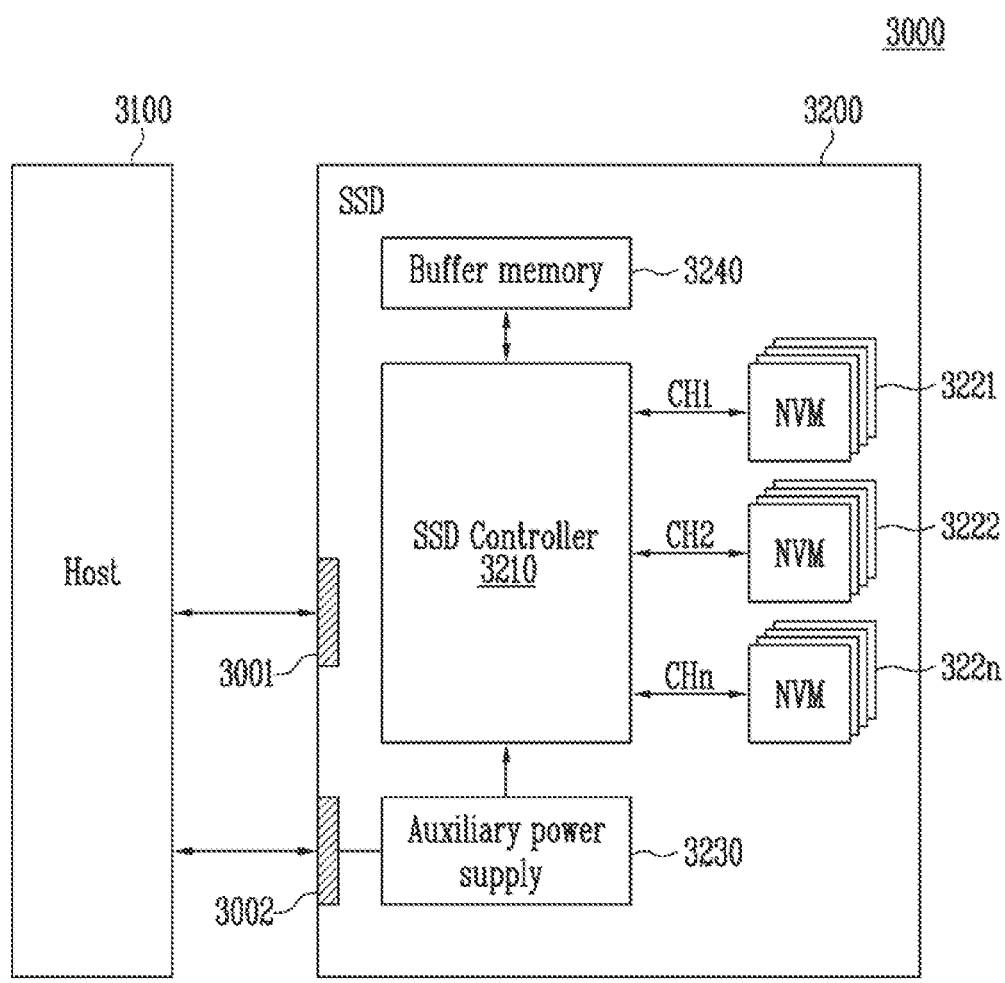
FIG. 17 is a block diagram Illustrating an example of a Solid State Drive (SSD) system to which a storage device is applied according to an embodiment.

The memory device 2200 may delay an operation on the corresponding die as much as a sub-period in which the peak currents of dies overlap, in response to the suspend command, FIG. 17 is a block diagram illustrating an example of a Solid State Drive (SSD) system 3000 to which a storage device is applied according to an embodiment.

Referring to FIG. 17, the SSD system 3000 may include a host 3100 and an SSD 3200. The SSD 3200 may exchange signals SIG with the host 3100 through a signal connector 3001 and may receive power PWR through a power connector 3002. The SSD 3200 may include an SSD controller 3210, a plurality of flash memory 3221 to 322n, an auxiliary power supply 3230, and buffer memory 3240.

According to an embodiment, the SSD controller 3210 may perform a function of the memory controller 200 of FIG. 1 described above with reference to FIG.

The SSD controller 3210 may control the plurality of flash memory 3221 to 322n in response to the signals SIG received from the host 3100. For example, the signals SIG may be signals based on interfaces of the host 3100 and the SSD 3200. For example, the signals SIG may be defined by at least one of various interfaces such as Universal Serial Bus (USB), Multi-Media Card (MMC), embedded MMC (eMMC), peripheral component interconnection (PCI), PCI-express (PCI-E), Advanced Technology Attachment (ATA), Serial-ATA (SATA), Parallel-ATA (PATA), small computer system interface (SCSI), enhanced small disk interface (ESDI), Integrated Drive Electronics (IDE), Firewire, Universal Flash Storage (UFS), WiFi, Bluetooth, and NonVolatile Memory express (NVMe) interfaces.

According to an embodiment, the SSD controller 3210 may determine an amount of current consumed by each of a plurality of dies included in the plurality of flash memory 3221 to 322n based on status information received from each of the plurality of flash memory 3221 to 322n, For example, the status information may be output from the plurality of flash memory 3221 to 322n in response to a status response command that is output when all of the dies included in the plurality of flash memory 3221 to 322n are in a busy state. The status information may divide a busy period of each die into a plurality of sub-periods having the same length and may include information about an amount of current consumed by each die corresponding to each of the plurality of sub-periods.

The SSD controller 3210 may determine whether sub-periods where peak currents of dies overlap based on the status information. In other words, the SSD controller 3210 may determine whether the maximum current is consumed in all dies included in the plurality of flash memory 3221 to 322n and whether sub-periods where the maximum current consumed by the dies overlap.

According to an embodiment, when the sub-periods where the peak current occurs in the plurality of dies overlap, the SSD controller 3210 may output a suspend command. The suspend command may instruct that an operation on at least one die among the plurality of dies should be delayed as much as a sub-period in which the peak currents for the plurality of dies overlap.

The plurality of flash memory 3221 to 322n may delay an operation on the corresponding die as much as a sub-period in which the peak currents overlap in response to the suspend command.

The auxiliary power supply 3230 may be coupled to the host 3100 through the power connector 3002. The auxiliary power supply 3230 may be charged with the power PWR supplied from the host 3100, The auxiliary power supply 3230 may supply power of the SSD 3200 when the power PWR is not smoothly supplied from the host 3100. For example, the auxiliary power supply 3230 may be disposed within or outside the SSD 3200. For example, the auxiliary power supply 3230 may be disposed on a main board and may supply auxiliary power to the SSD 3200.

The buffer memory 3240 may function as buffer memory of the SSD 3200. For example, the buffer memory 3240 may temporarily store data received from the host 3100 or data received from the plurality of flash memory 3221 to 322n, or may temporarily store metadata (e. g., mapping tables) of the plurality of flash memory 3221 to 322n, The buffer memory 3240 may include volatile memory such as DRAM, SDRAM, DDR SDRAM, LPDDR SDRAM, and GRAM or nonvolatile memory such as FRAM, ReRAM, STT-MRAM, and PRAM.

Figure 18:
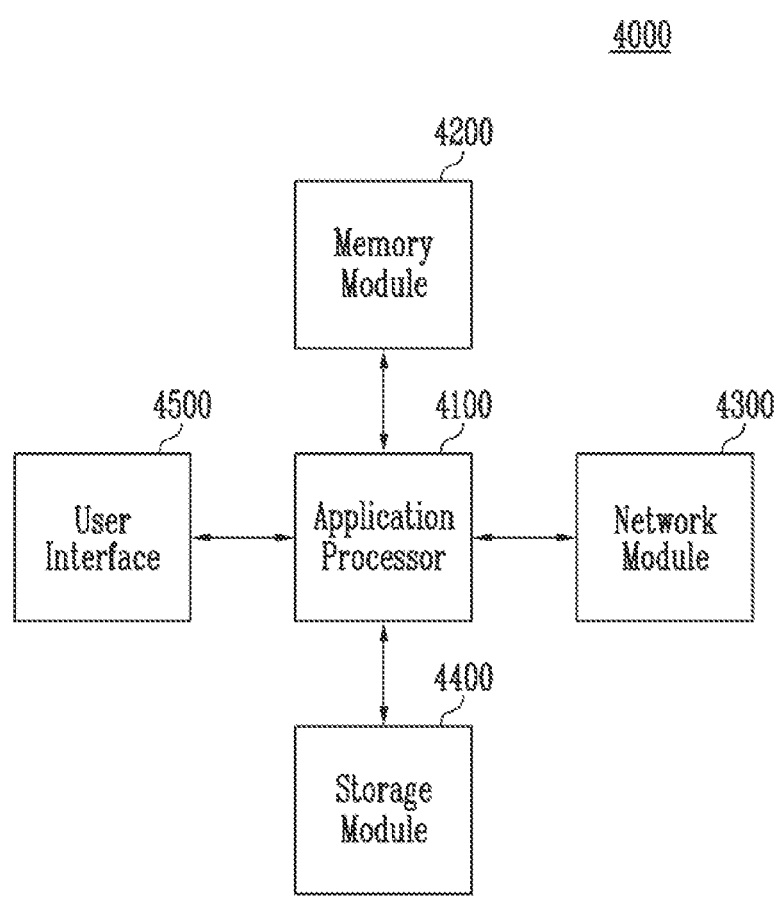
FIG. 18 is a block diagram illustrating a user system to which a storage device is applied according to an embodiment.

FIG. 18 is a block diagram illustrating a user system 4000 to which a storage device is applied according to an embodiment.

Referring to FIG. 18, the user system 4000 may include an application processor 4100, a memory module 4200, a network module 4300, a storage module 4400, and a user interface 4500.

The application processor 4100 may run components included in the user system 4000, an Operating System (OS), or a user program. For example, the application processor 4100 may include controllers, interfaces, graphic engines, and the like, for controlling the components included in the user system 4000. The application processor 4100 may be provided as a System on Chip (SoC).

The memory module 4200 may function as main memory, operational memory, buffer memory, or cache memory of the user system 4000. The memory module 4200 may include volatile random access memory such as DRAM, SDRAM, DDR SDRAM, DDR2 SDRAM, DDR3 SDRAM, LPDDR SDRAM, LPDDR2 SDRAM, and LPDDR3 SDRAM or nonvolatile random access memory such as PRAM, ReRAM, MRAM, and FRAM, For example, the application processor 4100 and the memory module 4200 may be packaged based on Package on Package (POP) to be provided as a single semiconductor package.

The network module 4300 may communicate with external devices. For example, the network module 4300 may support wireless communication, such as Code Division Multiple Access (CDMA), Global System for Mobile communication (GSM), wideband CDMA (WCDMA), CDMA-2000, TIME Division Multiple Access (TDMA), Long Term Evolution (LTE), Wimax, WLAN, UWB, Bluetooth, or Wi-Fi. For example, the network module 4300 may be included in the application processor 4100.

The storage module 4400 may store data. For example, the storage module 4400 may store data received from the application processor 4100, Alternatively, the storage module 4400 may transfer the data stored in the storage module 4400 to the application processor 4100. For example, the storage module 4400 may be embodied as a nonvolatile semiconductor memory device, such as a Phase-change RAM (PRAM) device, a Magnetic RAM (MRAM) device, a Resistive RAM (RRAM) device, a NAND flash memory device, a NOR flash memory device, or a NAND flash memory device having a three-dimensional (3D) structure. For example, the storage module 4400 may be provided as a removable storage medium (i.e., a removable drive), such as a memory card or an external drive of the user system 4000.

For example, the storage module 4400 may include a plurality of nonvolatile memory devices, each of which may operate in the same manner as the memory device described above with reference to FIGS. 2 and 3. The storage module 4400 may operate in the same manner as the storage device 50 described above with reference to FIG.

According to an embodiment, the application processor 4100 may determine an amount of current consumed by each of a plurality of dies included in the storage module 4400 based on status information received from the storage module 4400. For example, the status information may be output from the storage module 4400 in response to a status response command that is output when all of the dies included in the storage module 4400 are in a busy state. The status information may divide a busy period of each die into a plurality of sub-periods having the same length and may include information about an amount of current consumed by each die corresponding to each of the plurality of sub-periods.

The application processor 4100 may determine whether sub-periods occur in which peak currents overlap based on the status information. In other words, the application processor 4100 may determine whether the maximum current is consumed in all dies included in the storage module 4400 and whether sub-periods where the maximum current consumed by the dies overlap.

According to an embodiment, when the sub-periods where the peak current occurs in the plurality of dies overlap, the application processor 4100 may output a suspend command. The suspend command may instruct that an operation on at least one die among the plurality of dies should be delayed as much as a sub-period in which the peak current occurs in the plurality of dies overlap.

The storage module 4400 may delay an operation on the corresponding die as much as a sub-period in which the periods where the peak current occurs in the plurality of dies overlap in response to the suspend command.

The user interface 4500 may include interfaces which input data or commands to the application processor 4100 or output data to an external device. For example, the user interface 4500 may include user input interfaces such as a keyboard, a keypad, a button, a touch panel, a touch screen, a touch pad, a touch ball, a camera, a microphone, a gyroscope sensor, a vibration sensor, and a piezoelectric device. The user interface 4500 may further include user output interfaces such as a Liquid Crystal Display (LCD), an Organic Light Emitting Diode (OLED) display device, an Active Matrix OLED (AMOLED) display device, an LED, a speaker, and a monitor.

According to embodiments of the present disclosure, when busy periods of a plurality of dies overlap, the overlapping portion of the busy periods may be subdivided into sub-periods to determine a sub-period in which peak currents for multiple dies overlap. An operation of one of the plurality of dies may be suspended during the sub-period such that performance of a storage device may be improved.

What is claimed is:

1. A memory controller for controlling a memory device that includes a plurality of dies, the memory controller comprising:
   a status information determining component configured to identify, based on status information received from the memory device during a busy period when all of the plurality of dies are in a busy state, whether peak currents for multiple dies of the plurality of dies occur in a common sub-period of a plurality of sub-periods which span the busy period, and configured to generate suspend information based on the identification; and
   a peak current controller configured to output, based on the suspend information, a suspend command to suspend, during the common sub-period, an operation on at least one die among the multiple dies.

2. The memory controller of claim 1, wherein, when a ready/busy signal indicating that all of the plurality of dies are in the busy state is received from the memory device, the status information determining component outputs a status read command for obtaining information about an amount of current consumed by the plurality of dies.

3. The memory controller of claim 2, wherein the status information determining component receives the status information output from the memory device in response to the status read command.

4. The memory controller of claim 1, wherein the busy period is divided into the plurality of sub-periods that are predetermined and the status information includes information about an amount of current consumption corresponding to the plurality of sub-periods with respect to each of the plurality of dies.

5. The memory controller of claim 4, wherein the busy period is divided into the plurality of sub-periods based on a time interval for which a sub-operation on each of the plurality of dies is performed.

6. The memory controller of claim 4, wherein the status information determining component sums up amounts of current consumed by the plurality of dies with respect to each of the plurality of sub-periods based on the status information, and identifies whether the peak currents for the multiple dies occur in the common sub-period based on the summed up amounts of current.

7. The memory controller of claim 6, wherein the status information determining component identifies that the peak currents for the multiple dies occur in the common sub-period based on the summed up amounts of current having a maximum value.

8. The memory controller of claim 6, wherein, the status information determining component generates the suspend information when the peak currents for the multiple dies occur in the common sub-period, and
   wherein the suspend information includes information about the at least one die on which operation is suspended and a time interval over which the operation is suspended.

9. The memory controller of claim 8, wherein the time interval over which the operation is suspended corresponds to the common sub-period in which the peak currents for the multiple dies occur.

10. The memory controller of claim 8, wherein the peak current controller outputs the suspend command which instructs the at least one die, which is determined based on the suspend information, to suspend a specific operation by the time interval for which operation is suspended for the at least one die.

11. The memory controller of claim 8, wherein, after operation on the at least one die is suspended for the time interval, the peak current controller outputs a resume command for resuming suspended operation on the at least one die.

12. A method of operating a memory controller for controlling a memory device that includes a plurality of dies, the method comprising:
   receiving status information from the memory device during a busy period when all of the plurality of dies are in a busy state;
   identifying, based on the status information, whether peak currents for multiple dies of the plurality of dies occur in a common sub-period of a plurality of sub-periods which span the busy period;
   generating suspend information, based on the identification, for suspending an operation on at least one die among the multiple dies; and
   outputting, based on the suspend information, a suspend command to suspend, during the common sub-period, the operation on the at least one die.

13. The method of claim 12, wherein receiving the status information comprises:
   receiving a ready/busy signal indicating that all of the plurality of dies are in the busy state from the memory device; and
   outputting a status read command for obtaining information about an amount of current consumed by the plurality of dies,
   wherein the status information is output from the memory device in response to the status read command.

14. The method of claim 12, wherein the busy period is divided into the plurality of sub-periods that are predetermined and the status information includes information about an amount of current consumption corresponding to the plurality of sub-periods with respect to each of the plurality of dies.

15. The method of claim 14, wherein the busy period is divided into the plurality of sub-periods based on a time interval for which a sub-operation on each of the plurality of dies is performed.

16. The method of claim 14, wherein, identifying whether the peak currents for the multiple dies occur in the common sub-period comprises:

summing up amounts of current consumed by the plurality of dies with respect to each of the plurality of sub-periods based on the status information; and identifying, based on the summed up amounts of current, in which sub-period a summed peak current occurs.

17. The method of claim 16, wherein identifying in which sub-period the summed peak current occurs comprises identifying for which sub-period the summed up amounts of current have a maximum value.

18. The method of claim 16, further comprising generating the suspend information when the peak currents for the multiple dies occur in the common sub-period, wherein the suspend information includes information about the at least one die on which operation is suspended and a time interval over which the operation is suspended.

19. The method of claim 18, wherein, in generating the suspend information, the suspend information including the information about the time interval for which the operation is suspended is generated, and the time interval for which the operation is suspended corresponds to the length of the common sub-period.

20. A storage device, comprising:

a memory device including a plurality of dies; and a memory controller controlling the memory device, wherein the memory device generates status information about an amount of current consumed by each of the plurality of dies during a busy period when all of the plurality of dies are in a busy state, and wherein the memory controller identifies, based on the status information, whether peak currents for multiple dies of the plurality of dies are consumed in a common sub-period of a plurality of sub-periods which span the busy period, and when it is identified that peak currents for multiple dies are consumed in the common sub-period, the memory controller controls the memory device to suspend an operation on a die among the plurality of dies.

* * * * *